(12) United States Patent
Yan et al.

(10) Patent No.: US 10,996,641 B2
(45) Date of Patent: May 4, 2021

(54) SYSTEM AND METHOD FOR CONTROLLING AN HVAC SYSTEM OR AN ACMV SYSTEM OF A BUILDING

(71) Applicant: Hitachi, Ltd., Tokyo (JP)

(72) Inventors: Yang Yan, Singapore (SG); Rajesh Vellore Arumugam, Singapore (SG); Wujuan Lin, Singapore (SG)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/488,882

(22) PCT Filed: Oct. 2, 2017

(86) PCT No.: PCT/SG2017/050493
§ 371 (c)(1),
(2) Date: Aug. 26, 2019

(87) PCT Pub. No.: WO2019/070192
PCT Pub. Date: Apr. 11, 2019

(65) Prior Publication Data
US 2021/0080915 A1    Mar. 18, 2021

(51) Int. Cl.
*G05B 15/02*    (2006.01)
*F24F 11/46*    (2018.01)
(Continued)

(52) U.S. Cl.
CPC .............. *G05B 15/02* (2013.01); *F24F 11/46* (2018.01); *F24F 11/30* (2018.01); *F24F 11/62* (2018.01);
(Continued)

(58) Field of Classification Search
CPC ............ G05B 15/02; G05B 2219/2614; F24F 2120/10; F24F 11/64; F24F 11/46;
(Continued)

(56) References Cited

U.S. PATENT DOCUMENTS 8,560,126 B2   10/2013  Vass
9,245,229 B2    1/2016  Fadell
(Continued)

FOREIGN PATENT DOCUMENTS

WO    WO 2012/031278 A1    3/2012

OTHER PUBLICATIONS

International Preliminary Report on Patentability issued in corresponding International Application No. PCT/SG2017/050493 dated Apr. 8, 2020.
(Continued)

*Primary Examiner* — Ronald D Hartman, Jr.
(74) *Attorney, Agent, or Firm* — Foley & Lardner LLP

(57) ABSTRACT

Embodiments provide a system for controlling HVAC/ACMV system of a building, including an occupancy pattern extractor configured to generate at least one facility-based occupancy pattern for each facility type based on historical occupancy data and spatial information of the building; a zone occupancy predictor configured to predict zone occupancy variation of each zone after a predetermined time period, based on the facility-based occupancy patterns and real-time occupancy data; a similar zone matcher configured to match each zone with one or more pre-stored zones and determine air handler configurations based on the matched pre-stored zones; a configuration generator configured to determine configuration combinations by combining the air handler configurations for a plurality of zones of the building, each configuration combination including one of the air handler configurations for each zone; and a configuration optimizer configured to determine an optimal configuration combination based on one or more key performance indicators.

15 Claims, 17 Drawing Sheets

(51) Int. Cl.
*F24F 11/64* (2018.01)
*F24F 11/30* (2018.01)
*F24F 11/62* (2018.01)
*F24F 120/10* (2018.01)
*F24F 110/10* (2018.01)

(52) U.S. Cl.
CPC .......... *F24F 11/64* (2018.01); *F24F 2110/10* (2018.01); *F24F 2120/10* (2018.01); *G05B 2219/2614* (2013.01)

(58) Field of Classification Search
CPC ...... F24F 2110/10; F24F 11/30; F24F 11/006; F24F 11/62
See application file for complete search history.

(56) References Cited

U.S. PATENT DOCUMENTS

| | | | | |
|---|---|---|---|---|
| 9,696,055 | B1* | 7/2017 | Goodman | G05B 19/048 |
| 2006/0111816 | A1 | 5/2006 | Spalink | |
| 2010/0235004 | A1 | 9/2010 | Thind | |
| 2012/0150788 | A1 | 6/2012 | Berg-Sonne | |
| 2012/0215369 | A1* | 8/2012 | Desai | H02J 3/00 |
| | | | | 700/291 |
| 2012/0310376 | A1 | 12/2012 | Krumm | |
| 2014/0277757 | A1* | 9/2014 | Wang | F24F 11/30 |
| | | | | 700/276 |
| 2014/0309790 | A1* | 10/2014 | Ricci | G01C 21/3697 |
| | | | | 700/276 |
| 2015/0323915 | A1 | 11/2015 | Warren | |
| 2016/0359325 | A1* | 12/2016 | Kawata | H02J 3/14 |
| 2017/0307243 | A1* | 10/2017 | Burt | F24F 11/30 |
| 2018/0299153 | A1* | 10/2018 | Ajax | G05B 13/021 |
| 2019/0171171 | A1* | 6/2019 | Verteletskyi | G06Q 50/265 |
| 2020/0393157 | A1* | 12/2020 | Turney | F24F 11/46 |

OTHER PUBLICATIONS

International Search Report with English translation and Written Opinion issued in corresponding application No. PCT/SG2017/050493 dated Jun. 21, 2018.

* cited by examiner

SYSTEM AND METHOD FOR CONTROLLING AN HVAC SYSTEM OR AN ACMV SYSTEM OF A BUILDING

TECHNICAL FIELD

Embodiments relate generally to a system and a method of controlling an HVAC (heating, ventilation and air conditioning) system or an ACMV (air conditioning and mechanical ventilation) system of a building.

BACKGROUND

In recent decades, building/facility energy management had become a major concern. Many countries have introduced the concept of "green building" and various standard requirement on building energy usage, to enforce the building designed and operated in an energy efficient manner for maximum energy saving without compromising the occupants comfort level. To achieve such goals, the building owner may not only apply those recommended energy efficient technologies to various building system, e.g.: HVAC (heating, ventilation and air conditioning), ACMV (air conditioning and mechanical ventilation), lighting, facade, but also keep the building systems operated efficiently under the optimized control configuration.

Therefore, there is a need for the building owner and facility manager to make use of a Smart Building Energy Management System to monitor and control the real time building system operation, including HVAC or ACMV, lighting, lift and other systems. Among all the systems, HVAC or ACMV system usually consumes more than 50% of the total building energy in the daily operation. Therefore, the optimization of HVAC or ACMV system have attracted more attention from the building owner or facility manager compared to other systems.

There are many approaches to calculate the optimized system configuration setting in physical model based on the real-time sensor reading, occupancy rate and current weather condition. However, the HVAC or ACMV system usually takes half hour or longer time from the time the configuration is changed on board to the time it really takes effect on the building. Therefore, the prediction of thermal load demand is required at least half hour earlier to avoid the delay, thereby maintaining the comfort level of the occupants.

Some approaches in this area make use of the weather forecast data and occupancy prediction result, to predict a daily thermal load demand scheduling in advance. The occupancy prediction is usually based on real time sensing occupancy and a given predictive occupancy schedule or a specific occupancy pattern learned from historical data. U.S. Pat. No. 9,245,229 describes a method of predicting the building occupancy based on occupancy patterns, sensing occupancy and scheduling information. The occupancy patterns are stochastic statistical profiles which can be extracted from historical data or pre-seeded based on a specific building facility type, expected occupant type, season, or location. U.S. Patent Application Publication No. 2015/0323915 describes a method of predicting the occupancy state using a predictive time schedule and real-time event detection. The predictive schedule should be learned from historical occupancy data. Method of set point optimization for AHU (U.S. Pat. No. 8,560,126) describes a method of optimizing the AHU set point based on building location, sensed zone level air properties, a seasonal based thermal comfort index (TCL) schedule and user input occupancy parameters. The optimization is based only on the real-time sensor data, with no prediction on the change in zone air properties in advance. The main disadvantages of these approach is that the occupancy pattern is applicable only for single facility-type based buildings, such as office building or apartment. The occupants in the building are most likely same group of people, undertaking similar activities, and having mostly periodic and fixed human flow pattern.

These approaches may only predict the thermal load demand change based on the change of occupancy in advance in a single facility-based building, which could be a residential building, schools, or office building with a relatively fixed group of people, fixed or static human flow pattern and similar activities (e.g. similar metabolic activity levels). However, these approaches could not predict the thermal load demand variation in a multiple facilities-based building, such as shopping or commercial malls, due to highly dynamic human flow across different facilities and different human activities in different facilities. As a result, the thermal comfort level of a group of occupants in certain facility of the building may become sub-optimal. In addition, the building may consume unnecessary energy due to over cooling or heating. For a multiple facilities-based building, like a multi-functional shopping mall, the prediction of thermal load demand variation is a very challenging task. Accordingly, operating the building HVAC/ACMV system in an energy efficient manner for maximum energy saving without compromising the occupants' thermal comfort level has become a challenging task for building energy management system (BMS) due to the difficulty of predicting the thermal load demand variation in advance.

SUMMARY

According to various embodiments, a system for controlling the HVAC/ACMV system of the building may be provided. The building includes a plurality of zones, and each zone includes one or more types of facilities. The system may include an occupancy pattern extractor configured to generate at least one facility-based occupancy pattern for each facility type based on historical occupancy data and spatial information of the building; and a zone occupancy predictor configured to predict zone occupancy variation of each zone after a predetermined time period, based on the facility-based occupancy patterns and real-time occupancy data. The system may further include a similar zone matcher configured to match each zone with one or more pre-stored zones in a historical building database based on the predicated zone occupancy variation, and determine one or more air handler configurations for each zone based on the matched pre-stored zones. The system may further include a configuration generator configured to determine a plurality of configuration combinations for the building by combining the determined air handler configurations for the plurality of zones, each configuration combination including one of the determined air handler configurations for each zone; and a configuration optimizer configured to determine an optimal configuration combination from the plurality of configuration combinations based on one or more key performance indicators.

According to various embodiments, a method of controlling a building may be provided. The building includes a plurality of zones, and each zone includes one or more types of facilities. The method may include generating at least one facility-based occupancy pattern for each facility type based on historical occupancy data and spatial information of the building; predicting zone occupancy variation of each zone after a predetermined time period, based on the facility-based occupancy patterns and real-time occupancy data; matching each zone with one or more pre-stored zones in a historical building database based on the predicated zone occupancy variation, and determining one or more air handler configurations for each zone based on the matched pre-stored zones; determining a plurality of configuration combinations for the building by combining the determined air handler configurations for the plurality of zones, each configuration combination including one of the determined air handler configurations for each zone; and determining an optimal configuration combination from the plurality of configuration combinations based on one or more key performance indicators.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
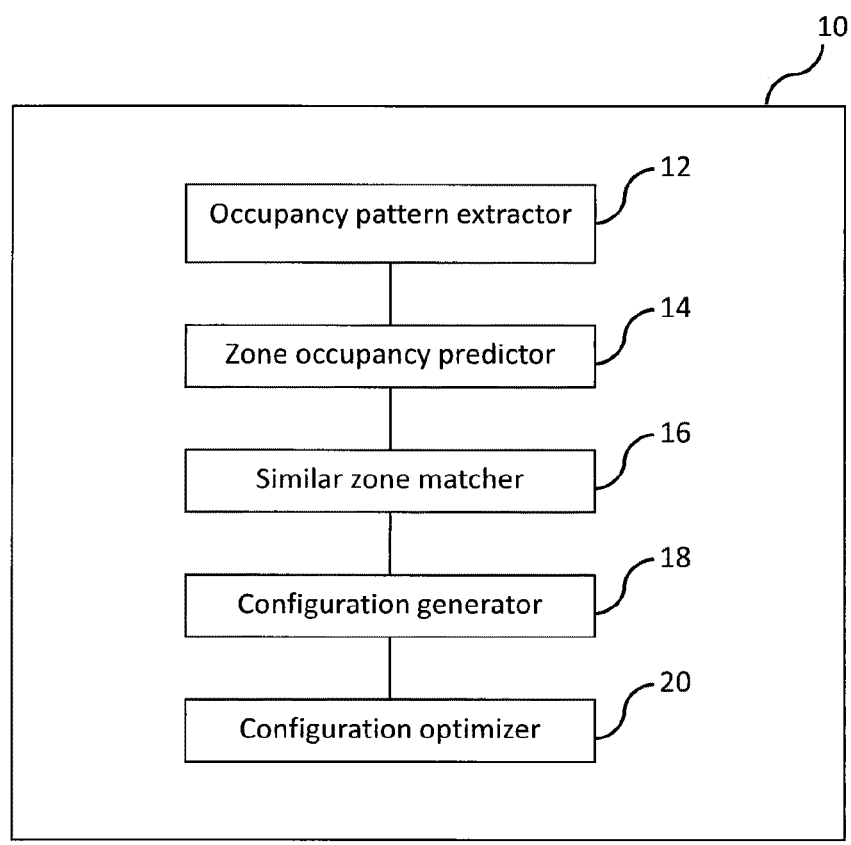
FIG. 1 shows a conceptual diagram of a system for controlling a building according to various embodiments.

Embodiments described below in context of the systems are analogously valid for the respective methods, and vice versa. Furthermore, it will be understood that the embodiments described below may be combined, for example, a part of one embodiment may be combined with a part of another embodiment.

It will be understood that any property described herein for a specific building control system may also hold for any building control system described herein. It will be understood that any property described herein for a specific method may also hold for any method described herein. Furthermore, it will be understood that for any building control system or method described herein, not necessarily all the components or steps described must be enclosed in the system or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

According to various embodiments, the system and the method consider the influence of both dynamic human flow across different facilities and different activities in different facilities by different groups of occupants. For example, the metabolic activity level of people in a fitness center is much higher than the metabolic activity level of people in a Cineplex with both these facilities being in the same building (e.g.: a commercial complex). The system and the method of various embodiments utilize historical human flow data from existing optimized or partially optimized (e.g., semi-optimized) multiple-facility buildings to predict the occupancy variations/changes of the selected building, and derive an optimized configuration through multiple similar zone matching process in a finer granularity for accurate thermal load demand response in advance. The thermal load demand may depend on a few impact factors, including but not limited to weather condition, occupancy rate, building design, location, seasons, and zone air properties, and can be simulated through machine learning or physical models. The result may be used to guide the facility manager to assign the appropriate configurations to both load sourcing and air distribution side to maintain the system operating at a high efficiency.

Several aspects of the system and the method for controlling an HVAC (heating, ventilation and air conditioning) system or an ACMV (air conditioning and mechanical ventilation) system of a building will now be described in more detail in various embodiments below. These system and method will be described in the following detailed description and illustrated in the accompanying drawings by various blocks, components, circuits, processes, algorithms, modules, etc., which may be implemented using electronic hardware, computer software, or any combination thereof.

In this context, the system for controlling an HVAC system or an ACMV system of a building as described in this description may include a memory which is for example used in the processing carried out in the system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

By way of example, the system for controlling the HVAC or ACMV system of the building may be implemented as a "processing system" or a computing device, which includes one or more processors. One or more processors in the processing system or computing device may execute software, and may be coupled to a memory to execute software stored in the memory. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions of the system and the method described may be implemented in hardware, software, or any combination thereof. If implemented in software, the functions may be stored on or encoded as one or more instructions or code on a computer-readable medium. Computer-readable medium includes computer storage medium. Storage medium may be any available medium that can be accessed by a computer. By way of example, and not limitation, such computer-readable medium may include a random-access memory (RAM), a read-only memory (ROM), an electrically erasable programmable ROM (EEPROM), a flash memory, optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a conceptual diagram of a system for controlling an HVAC (heating, ventilation and air conditioning) system or an ACMV (air conditioning and mechanical ventilation) system of a building according to various embodiments.

As shown in FIG. 1, a system 10 for controlling an HVAC system or an ACMV system of a building may be provided. The building includes a plurality of zones, and each zone includes one or more types of facilities. The system 10 may include an occupancy pattern extractor 12 configured to generate at least one facility-based occupancy pattern for each facility type based on historical occupancy data and spatial information of the building; and a zone occupancy predictor 14 configured to predict zone occupancy variation of each zone after a predetermined time period, based on the facility-based occupancy patterns and real-time occupancy data. The system 10 may further include a similar zone matcher 16 configured to match each zone with one or more pre-stored zones in a historical building database based on the predicated zone occupancy variation, and determine one or more air handler configurations for each zone based on the matched pre-stored zones. The system 10 may further include a configuration generator 18 configured to determine a plurality of configuration combinations for the building by combining the determined air handler configurations for the plurality of zones, each configuration combination including one of the determined air handler configurations for each zone; and a configuration optimizer 20 configured to determine an optimal configuration combination from the plurality of configuration combinations based on one or more key performance indicators (KPI).

In other words, the building control system 10 of various embodiments includes the occupancy pattern extractor 12 configured to generate facility-based occupancy pattern for each facility type, and the zone occupancy predictor 14 configured to predict zone-level occupancy variation of the predetermined time period later for each zone, such that a more accurate prediction of occupancy variation is achieved which takes into consideration of dynamic human flow and different human activities in different facilities and different zones of the building. The predetermined time period may be a short time period, for example, in the order of minutes or hours, thereby considering the influence of dynamic human flow. The similar zone matcher 16 is provided to match each zone with the pre-stored zones and determine the air handler configurations based on the matched pre-stored zones. The configuration generator 18 is provided to combine the determined air handler configurations for the plurality of zones in all possible combinations so as to determine the plurality of potential configuration combinations for the building, and the configuration optimizer 20 is provided to determine an optimal configuration combination from the plurality of configuration combinations based on one or more key performance indicators. In this manner, the previous air handler configurations of pre-stored zones, which may be optimized or partially optimized zones, may be used to determine various combinations of these air handler configurations for the entire building, and to derive the optimal configuration combination based on the predetermined KPI in a more efficient manner. The optimal configuration combination, after having been applied to the building in advance, may achieve the desired KPI after the predetermined time period.

According to various embodiments, the occupancy pattern extractor 12 is configured to generate more than one facility-based occupancy pattern for each facility type based on different visitor groups. The visitor groups may be categorized by at least one of gender, age, or occupation.

In various embodiments, the facility-based occupancy pattern for each facility type may include one or more attributes selected from facility identification, facility name, average dwelling time, day of a week, time range, and next destination.

According to various embodiments, the real-time occupancy data may be real-time data detected by various types of detectors. Examples of the detectors may include but are not limited to video cameras, wireless device detectors, door sensors, and public transit system entry/exit in the building, etc. The wireless device detectors may include one of wireless receivers, wireless transceivers or wireless routers, e.g., Wi-Fi routers, configured to provide wireless internet access in a wireless local area network or a cellular network for a wireless device, for example. According to various embodiments, a visitor or an occupant in the building may carry a wireless device, such as a mobile telephone, a mobile computer, a tablet computer, a gaming console, a digital camera, a digital audio player, a smart watch or a wearable technology device. The wireless device detector may collect wireless data of the detected wireless devices, including identification codes of the respective wireless devices, which may be used to detect or identify a visitor.

According to various embodiments, the zone occupancy predictor 14 is further configured to determine a visiting sequence for each visitor detected from the real-time occupancy data based on the facility-based occupancy patterns. In an exemplary embodiment, the visiting sequence may be unique for each visitor, who may be a regular visitor identified by a unique identification code of a wireless device detected from the real-time occupancy data and whose visiting sequence of various facilities at different time may be determined from the facility-based occupancy patterns. The identifier code may be a media access control (MAC) identification document (ID), also referred herein as MAC address or MAC-ID. The identifier code may also be any one of a unique device identifier (UDID), Android ID, international mobile equipment identity (IMEI) or international mobile subscriber identity (IMSI). In other embodiments, for new visitors and non-regular visitors, a common visiting sequence may be determined from the facility-based occupancy patterns.

In various embodiments, the zone occupancy predictor 14 is further configured to predict a future occupancy after the predetermined time period for each zone based on the visiting sequence; and predict the zone occupancy variation of each zone after the predetermined time period based on the predicted future occupancy and the real-time occupancy data.

In various embodiments, the zone occupancy predictor 14 is further configured to predict a dwelling time staying at a current facility and a next facility for each visitor, based on the visiting sequence. The zone occupancy predictor 14 is configured to predict a future occupancy after the predetermined time period in each facility based on the predicted dwelling time and the predicted next facility; and predict the future occupancy after the predetermined time period for each zone based on the predicted future occupancy in each facility.

According to various embodiments, the similar zone matcher 16 is configured to match each zone with the one or more pre-stored zones in the historical building database further based on at least one of a visiting sequence within the zone, the spatial information of the building, real-time zone air properties, desired thermal comfort level (TCL) index, time stamp, or weather data.

According to various embodiments, the similar zone matcher 16 is further configured to determine one or more zone air configurations for each zone of the building based on the matched pre-stored zones.

According to various embodiments, the historical building database may include at least one of zone air configurations or air handler configurations of the pre-stored zones, wherein the pre-stored zones includes zones of at least one of a pre-configured building or an un-configured building. The pre-configured building may include optimized and/or partially optimized building, which has been pre-configured according to various embodiments of this description, e.g., to determine the optimal zone air configuration or air handler configuration of the building. The un-configured building may include un-optimized building not having been configured or verified to determine the optimal configuration, e.g., zone air configuration or air handler configuration, of the building. According to various embodiments, the pre-stored zones may include at least one of optimized, partially optimized, or un-optimized zones. The pre-stored zones may include optimized, partially optimized, and/or un-optimized zones of the pre-configured buildings. The pre-stored zones may include un-optimized zones of the un-configured building.

In various embodiments, the air handler (AHU) configurations refer to the configurations of the air handler of the building, also referred to as air handling unit (AHU) which is a part of a HVAC (heating, ventilation and air conditioning) or ACMV (air conditioning and mechanical ventilation) system of the building. In various embodiments, the air handler configuration may include at least one of supply air temperature set point, variable speed drive fan speed set point, or fresh air damper position set point.

In this context, the configuration optimizer may also be referred to as an air side optimizer, which determines the optimal combination of air handler configurations for the plurality of the zones of the entire building.

According to various embodiments, if the matched zone is an un-optimized zone in the historical database, the similar zone matcher 16 is further configured to retrieve zone air properties variation of the matched pre-stored zone; estimate future zone air properties of the zone based on the retrieved zone air properties variation; estimate at least one of a thermal load demand variation or a fresh air demand variation based on the estimated future zone air properties; and determine an air handler configuration for the zone based on at least one of the estimated thermal load demand variation or the estimated fresh air demand variation.

According to various embodiments, the system 10 may further include a chiller plant optimizer (not shown) configured to determine an optimal chiller plant configuration based on the optimal configuration combination and the spatial information of the building.

The chiller plant optimizer may be further configured to determine a thermal load variation for each zone based on the optimal configuration combination and the spatial information of the building; sum up the thermal load variations for the plurality of zones of the building; and determine the optimal chiller plant configuration based on the sum of the thermal load variations.

According to various embodiments, the system 10 may further include a configuration validator (not shown) configured to apply the optimal configuration combination and the optimal chiller plant configuration to the building for the predetermined time period, determine values of the one or more key performance indicators after the predetermined time period, and validate the optimal configuration combination and the optimal chiller plant configuration based on a comparison between the determined values of the one or more key performance indicators and desired values of the one or more key performance indicators.

In various embodiments, the one or more key performance indicators may include one or more of energy saving, energy efficiency, energy usage, or thermal comfort.

In various embodiments, the system 10 may be implemented as one or more computing devices, each including one or more circuits or processors referred to above. In an exemplary embodiment, the system 10 may include a memory, and one or more processors coupled to the memory and configured to perform the functions of the occupancy pattern extractor 12, the zone occupancy predictor 14, the similar zone matcher 16, the configuration generator 18, the configuration optimizer 20, the chiller plant optimizer, the configuration validator described above. In various embodiments, the occupancy pattern extractor 12, the zone occupancy predictor 14, the similar zone matcher 16, the configuration generator 18, the configuration optimizer 20, the chiller plant optimizer, the configuration validator described above may be respectively implemented in one or more circuits or processors, or may be implemented in a single circuit or processor.

Figure 2:
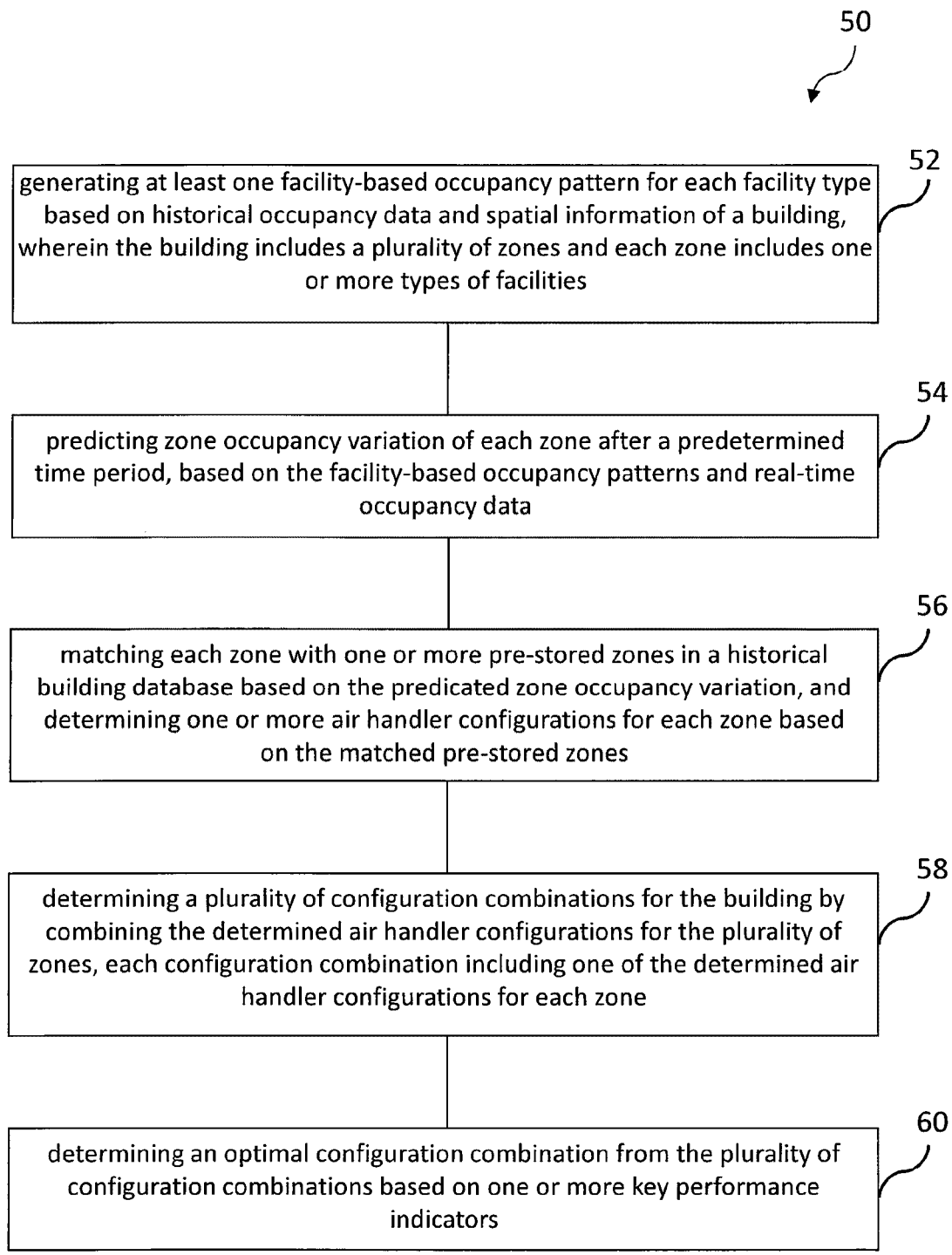
FIG. 2 shows a flow diagram showing a method of controlling a building according to various embodiments.

FIG. 2 shows a flow diagram 50 showing a method of controlling an HVAC (heating, ventilation and air conditioning) system or an ACMV (air conditioning and mechanical ventilation) system of a building according to various embodiments. Various embodiments of the building control system 10 described above are analogously valid for the method, and vice versa.

The flow diagram 50 includes a plurality of processes or steps 52, 54, 56, 58 and 60. In 52, at least one facility-based occupancy pattern for each facility type is generated based on historical occupancy data and spatial information of the building. In 54, zone occupancy variation of each zone after a predetermined time period is predicted based on the facility-based occupancy patterns and real-time occupancy data. In 56, each zone is matched with one or more pre-stored zones in a historical building database based on the predicated zone occupancy variation, and one or more air handler configurations are determined for each zone based on the matched pre-stored zones. In 58, a plurality of configuration combinations for the building is determined by combining the determined air handler configurations for the plurality of zones, each configuration combination including one of the determined air handler configurations for each zone. In 60, an optimal configuration combination is determined from the plurality of configuration combinations based on one or more key performance indicators.

According to various embodiments, the method 50 may further include generating more than one facility-based occupancy pattern for each facility type based on different visitor groups. The visitor groups may be categorized by at least one of gender, age, or occupation.

In various embodiments, the facility-based occupancy pattern for each facility type may include one or more attributes selected from facility identification, facility name, average dwelling time, day of a week, time range, and next destination.

According to various embodiments, the real-time occupancy data may be real-time data detected by various types of detectors. Examples of the detectors may include but are not limited to video cameras, wireless device detectors, door sensors, and public transit system entry/exit in the building, etc.

According to various embodiments, the method 50 may further include determining a visiting sequence for each visitor detected from the real-time occupancy data based on the facility-based occupancy patterns; predicting a future occupancy after the predetermined time period for each zone based on the visiting sequence; and predict the zone occupancy variation of each zone after the predetermined time period based on the predicted future occupancy and the real-time occupancy data.

In an exemplary embodiment, the visiting sequences may include unique visiting sequences for regular visitors, and/or a common visiting sequence for new visitors and non-regular visitors as determined from the facility-based occupancy patterns.

In various embodiments, the method 50 may further include predicting a dwelling time staying at a current facility and a next facility for each visitor based on the visiting sequence; predicting a future occupancy after the predetermined time period in each facility based on the predicted dwelling time and the predicted next facility; and predict the future occupancy after the predetermined time period for each zone based on the predicted future occupancy in each facility.

According to various embodiments, the method 50 may further include matching each zone with the one or more pre-stored zones in the historical building database further based on at least one of a visiting sequence within the zone, the spatial information of the building, real-time zone air properties, desired thermal comfort level (TCL) index, time stamp, or weather data.

According to various embodiments, the method 50 may further include determining one or more zone air configurations for each zone of the building based on the matched pre-stored zones.

According to various embodiments, if the matched pre-stored zone is an un-optimized zone in the historical database, the method 50 may further include retrieving zone air properties variation of the matched pre-stored zone; estimating future zone air properties of the zone based on the retrieved zone air properties variation; estimating at least one of a thermal load demand variation or a fresh air demand variation based on the estimated future zone air properties; and determining an air handler configuration for the zone based on at least one of the estimated thermal load demand variation or the estimated fresh air demand variation.

According to various embodiments, the method 50 may further include determining an optimal chiller plant configuration based on the optimal configuration combination and the spatial information of the building.

In various embodiments, the method 50 may determine a thermal load variation for each zone based on the optimal configuration combination and the spatial information of the building; sum up the thermal load variations for the plurality of zones of the building; and determine the optimal chiller plant configuration based on the sum of the thermal load variations.

According to various embodiments, the method 50 may further include applying the optimal configuration combination and the optimal chiller plant configuration to the building for the predetermined time period, determining values of the one or more key performance indicators after the predetermined time period, and validating the optimal configuration combination and the optimal chiller plant configuration based on a comparison between the determined values of the one or more key performance indicators and desired values of the one or more key performance indicators.

In various embodiments, the one or more key performance indicators may include one or more of energy saving, energy efficiency, energy usage, or thermal comfort.

In a further aspect, various embodiments may further provide a computer readable medium storing instructions, which when executed by a processor, cause the processor to perform the method 50 described in various embodiments above.

In the following, the building control system and method according to various embodiments are described in more detail.

Figure 3:
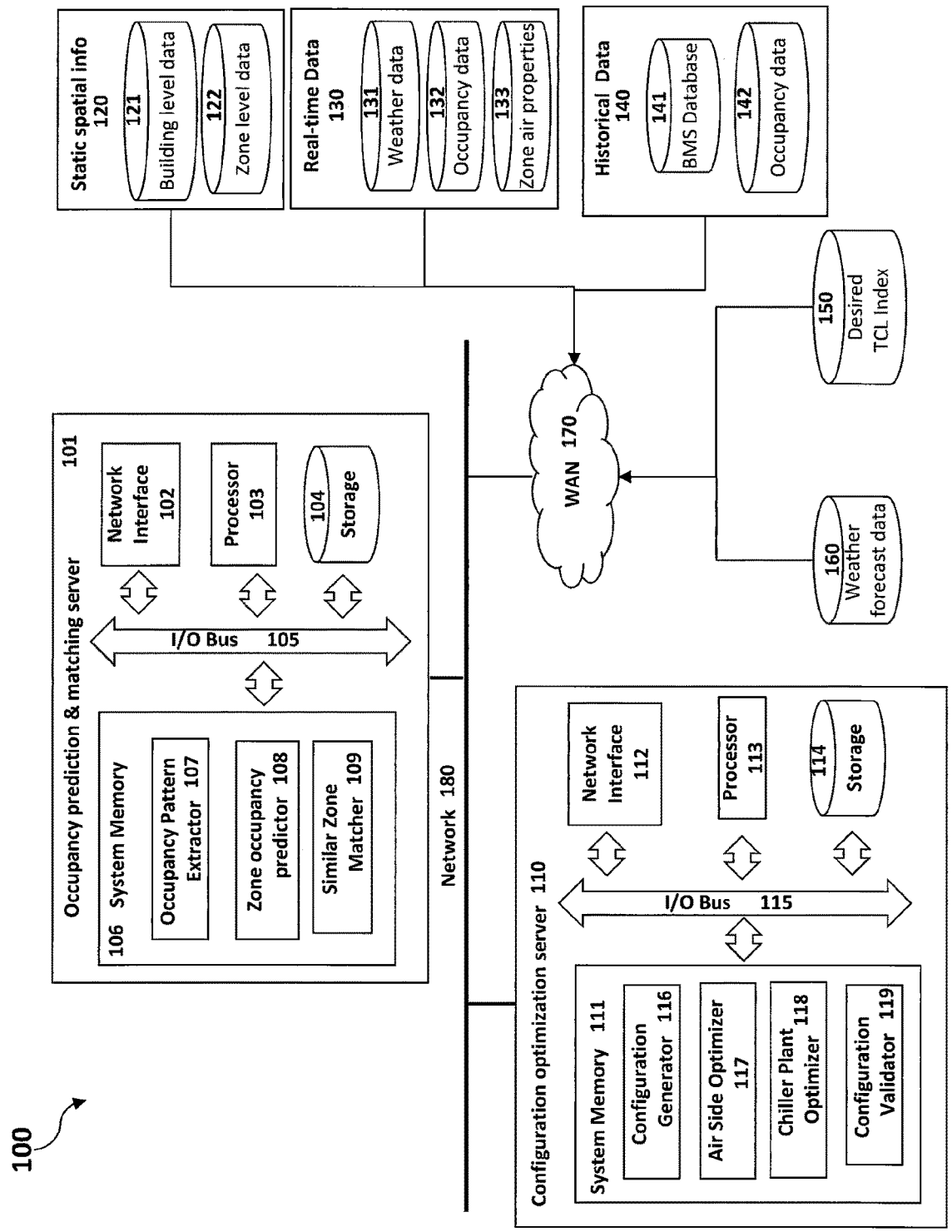
FIG. 3 shows a system architecture of a building control system according to various embodiments.

FIG. 3 shows a system architecture of a building control system 100 according to various embodiments. The system architecture of FIG. 3 may be applied for the system 10 and method 50 described in various embodiments above. The building control system 100 may be or may include the building control system 10 described above. Various embodiments of the building control system 10 described above are analogously valid for the building control system 100, and vice versa.

As shown in FIG. 3, the system 100 includes an occupancy prediction and matching server 101, a configuration optimization server 110, and various data sources including static spatial information 120 of the building, real-time data 130, historical data 140, weather forecast data 160 and user input requirement for the thermal comfort level (TCL) index 150.

According to various embodiments, the occupancy prediction and matching server 101 may run one or more instance of the occupancy pattern extractor 107, zone occupancy predictor 108 and similar zone matcher 109, which may be implemented as programs residing in a system memory 106 of the server 101. The occupancy pattern extractor 107, zone occupancy predictor 108 and similar zone matcher 109 may be the occupancy pattern extractor 12, zone occupancy predictor 14 and similar zone matcher 16 described above, respectively. The server 101 further includes a processor 103 configured to execute the program stored in the system memory 106, a network interface 102 and a storage 104 for storing temporary results and output data. The network interface 102, the processor 103, the storage 104 and the system memory 106 are interconnected by the I/O bus 105.

According to various embodiments, the configuration optimization server 110 may run one or more instance of the configuration generator 116, air side optimizer 117, chiller plant optimizer 118 and configuration validator 119, which may be implemented as programs residing in a system memory 111 of the server 110. The configuration generator 116, air side optimizer 117, chiller plant optimizer 118 and configuration validator 119 may be the configuration generator 18, configuration optimizer 20, chiller plant optimizer and configuration validator, respectively, as described in FIG. 1 above. The server 110 further includes a processor 113 configured to execute the program stored in the system memory 111, a network interface 112 and a storage 114 for storing temporary results and output data. These components of the server 110 are interconnected by the I/O bus 115.

Although the system architecture of FIG. 3 shows embodiments, wherein the occupancy pattern extractor 107, zone occupancy predictor 108, similar zone matcher 109, the configuration generator 116, air side optimizer 117, chiller plant optimizer 118 and configuration validator 119 are implemented in two servers 101, 110, it is understood that they may also be implemented in a single server or computing device, or implemented in more than two servers or computing devices.

The static spatial information 120 input to the system 100 may include building level data 121 and zone level data 122, which may be collected from the building owner or designer. The real-time data 130 may include real-time weather condition data 131 monitored by a weather station, real-time occupancy data 132 and real-time zone air properties 133. The weather data 131 may include but is not limited to the following attributes: outdoor air temperature, outdoor relative humidity, solar radiation, etc. The real-time occupancy data 132 may be detected through various methods, including but not limited to Wi-Fi/cellular data tracking, door sensors, video cameras, public transit system entry/exit in the building, etc. The real-time zone air properties 133 may include temperature, relative humidity, air flow speed and $CO_2$ concentration. The historical data 140 may include a building management system (BMS) database 141 including records of pre-configured buildings trended over a few months or one year in the past. The historical occupancy data 142 may be collected through Wi-Fi routers, occupancy sensors, video cameras, public transit system entry/exit in the building, etc. The weather forecast data 160 may be retrieved from an online portal of official weather forecasting agents through API service. The requirement for TCL Index 150 may include a suitable range of air temperature, relative humidity, air flow speed and $CO_2$ concentration to satisfy human comfort level, which can be referred to international standards or computed from real-time customer votes through a voting APP. These data may flow into the system 100 over an internal network 180 or WAN (wide area network) 170 for external data sources.

Figure 4:
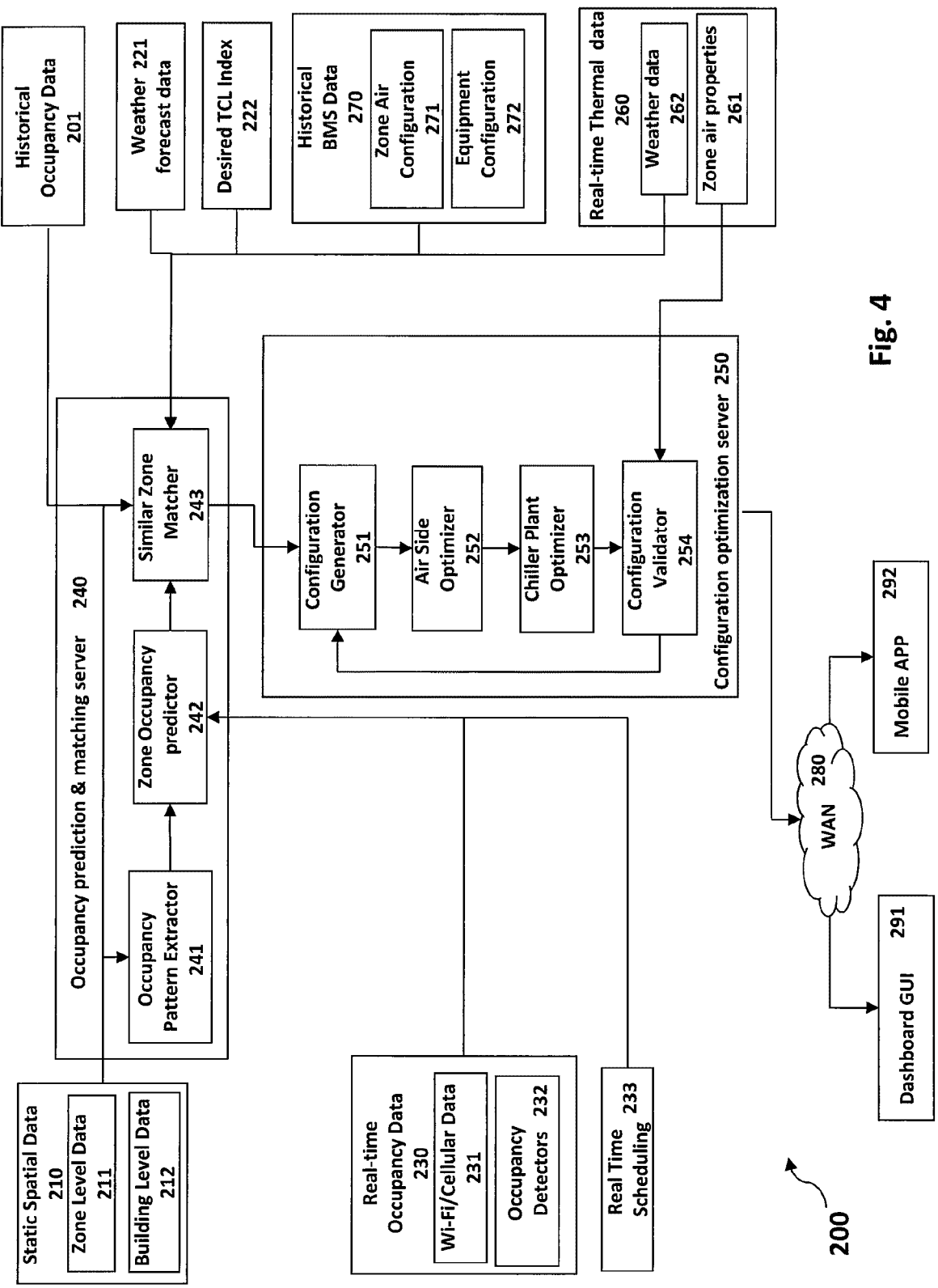
FIG. 4 shows a building control system and data flow of the system according to various embodiments.

FIG. 4 shows a building control system 200 and the data flow of the system according to various embodiments. The building control system 200 may be or may include the building control system 10, 100 described above. Various embodiments of the building control system 200 are analogously valid for the building control system 10, 100, and vice versa.

For each zone of a selected building planned to be optimized, the occupancy prediction and matching server 240 may be configured to search for one or more similar zones from other pre-configured, which are already able to adjust the HVAC/ACMV configuration in a short periodical granularity, e.g.: half hour, to address dynamic thermal demand response due to high dynamic human flow, and collect the corresponding zone air configurations and/or supply air (e.g.: supplied by AHU) configurations, or un-configured buildings, if no similar zone can be matched from the pre-configured buildings. The configuration optimization server 250 may be configured to utilize the output of the occupancy prediction and matching server 240 to simulate the best/optimal configuration setting for the entire building.

In the occupancy prediction and matching server 240, the occupancy pattern extractor 241 is configured to generate a number of facility-type based occupancy patterns based on the historical occupancy data 201 and static spatial data 210 (including both building level data 212 and zone level data 211) of an existing building. The zone occupancy predictor 242 is configured to utilize the output of the occupancy pattern extractor 241, and the real-time detected occupancy data 230 including Wi-Fi/cellular data 231 or data from other occupancy detectors 232 to predict the zone level occupancy variation after a predetermined time period, e.g., half an hour or one hour later. In an embodiment, the zone occupancy predictor 242 may also utilize real-time scheduling 233 of the building to perform the prediction.

The similar zone matcher 243 may be configured to utilize the output of the zone occupancy predictor 242 to search for one or more similar zones from other pre-configured (e.g. optimized) or un-configured buildings based on the historical BMS data 270, and determine the zone air configurations 271 and/or equipment configurations 272 (e.g.: AHU-VAV) based on the matched zones. The equipment configurations 272 may be air handler (AHU) configurations, for example, AHU-VAV (Air Handling Unit—Variable Air Volume system) configurations. In the embodiments wherein the matched zones are optimized or partially optimized zones, the zone air configurations 271 and/or equipment configurations 272 of the matched zones may be directly retrieved. In the embodiments wherein the matched zones are unoptimized zones, the zone air configurations and/or equipment configurations may be determined according to the embodiments of FIG. 10 described below. In various embodiments, the similar zone matcher 243 may be configured to perform the zone matching and configuration determination, further based on one or more of weather forecast data 221, desired TCL index 222, zone spatial data 211, or real-time thermal data 260 including real-time zone air properties 261 and real-time weather data 262. One or more instances of the occupancy pattern extractor 241, zone occupancy predictor 242, similar zone matcher 243 may run on the sever 240 to perform the occupancy prediction and zone matching.

According to various embodiments, the configuration generator 251 running on the configuration optimization server 250 may be configured to receive and store the potential air side configurations (e.g.: AHU configurations) for each zone from the occupancy prediction and matching server 240, and generate all possible combinations of the AHU configurations for the entire building with equal weightage at this stage. Each of the possible combinations will be input into the air side optimizer 252 (also referred to as configuration optimizer above), which is configured to determine the optimal AHU configuration combination for all the zones through simulation, based on the KPI attributes selected by the user.

According to various embodiments, the chiller plant optimizer 253 may be configured to utilize the output of air side optimizer 252 to compute the corresponding new configuration to adopt the estimated total variation of thermal load demand for the entire building. The configuration validator 254 may be configured to apply the output of the air side optimizer 252 and the chiller plant optimizer 253 through a control panel of the BMS system, and collects the zone air properties after the predetermined time period (e.g., half an hour later) to examine and validate the effectiveness of the applied configurations. Based on the evaluation result, a new weightage can be calculated and assigned back to the configuration generator 251, and may be stored in the memory. One or more instances of the configuration generator 251, air side optimizer 252, chiller plant optimizer 253 and configuration validator 254 may run on the configuration optimization server 250.

Similar to the embodiments of FIG. 3 described above, the various blocks 241, 242, 243, 251, 252, 253, 254 may also be implemented in a single server or computing device, or implemented in more than two servers or computing devices.

In various embodiments, the output of the air side optimizer 252, the chiller plant optimizer 253 and the configuration validator 254 may be viewed from a dashboard 291 by a building owner or a facility manager, or received through a mobile APP 292. This could be achieved by an interconnection over WAN (Wide area network) links 280 or the internet through secure channels.

Figure 5:
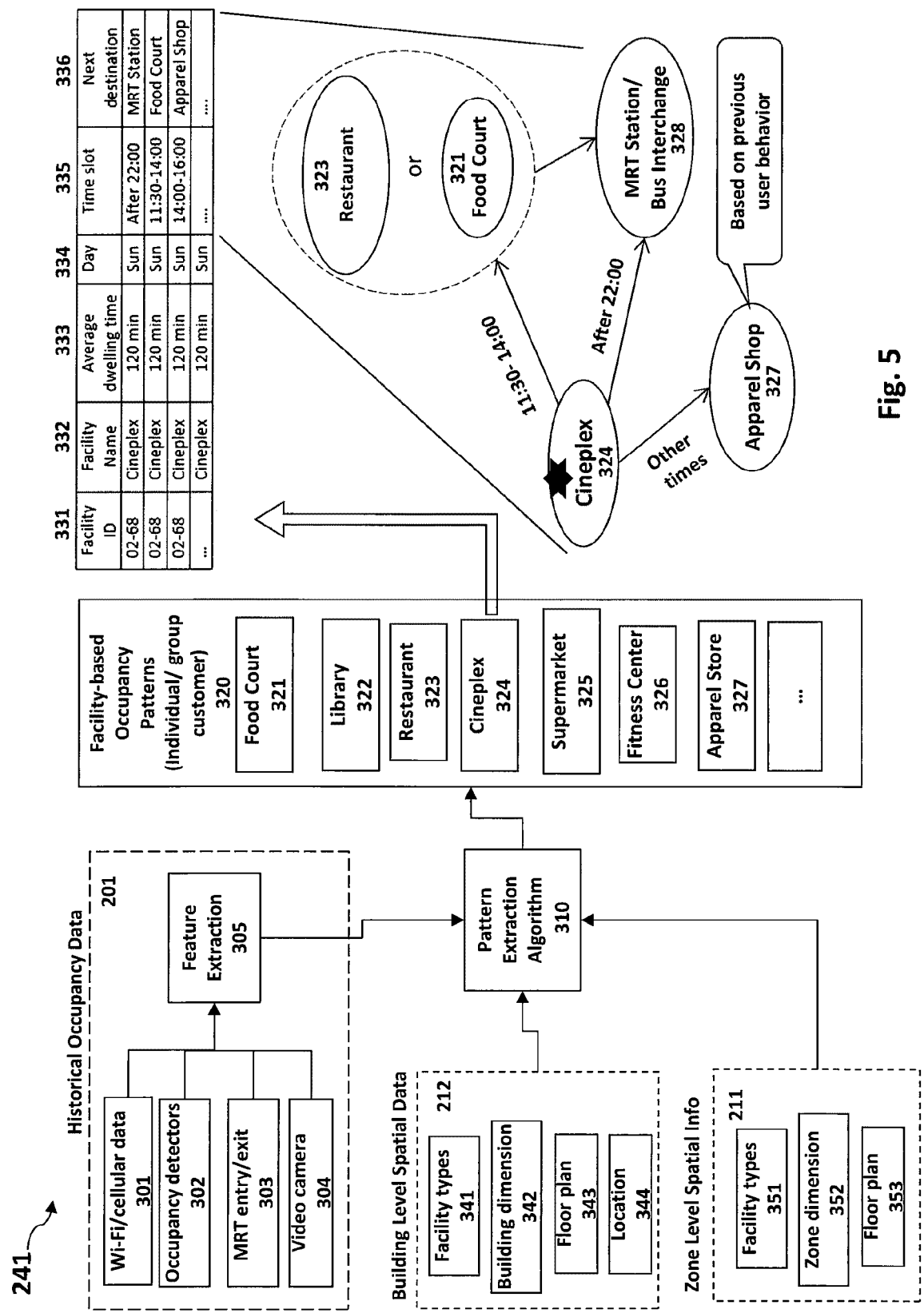
FIG. 5 shows a block diagram illustrating extraction of occupancy patterns for each facility type in an existing building in the occupancy pattern extractor according to various embodiments.

FIG. 5 shows a block diagram illustrating extraction of occupancy patterns for each facility type in an existing building in the occupancy pattern extractor according to various embodiments. The input data, process flow and output data for the occupancy pattern generation are illustrated in the embodiments of FIG. 5.

The input data to the occupancy pattern extractor 241 may include the historical occupancy data 201 for a period of several days, months, years or longer time, and spatial information of the building. The spatial information may include building level spatial data 212 and zone level spatial data 211. The historical occupancy data 201 may be collected from various types of sources, including but not limited to Wi-Fi/cellular data tracker 301, occupancy detectors 302 (e.g., door sensors), public transit system entry/exits in the building 303 (e.g., MRT Entry/Exit), video cameras 304.

The occupancy pattern extractor 241 may include a feature extraction unit 305 configured to apply feature extraction techniques, such as but not limited to principle component analysis or non-linear dimensionality reduction, on the historical occupancy detection data input 201, to combine and filter the information and transform them into a uniform feature representation. The building level spatial data 212 may include building location 344 which can be indicated by a postal code, building dimension 342, floor plan 343 and facility types 341 which can be obtained from the floor plan. The building facility types may include but are not limited to Food Court 321, Library 322, Restaurant 323, Cineplex 324, Supermarket 325, Fitness center 326, Apparel store 327 etc. Similarly, the zone level spatial data 211 may include facility types 351 located in each zone, zone dimension 352 and floor plan 353 for each individual zone. The input of occupancy pattern extractor 241 may be processed by a pattern extraction algorithm 310, e.g., decision trees, to generate a group of facility-based occupancy patterns 320. In various embodiments, at least one occupancy pattern may be generated for each of the facility types appeared in the building.

According to various embodiments, extracted occupancy patterns 320 may be described or represented by a few key attributes, such as facility ID 331 indicating the location of the facility, facility name 322, average dwelling time 333, Day of the week 334, Time range 335 and Next destination 336. In an illustrative example, the occupancy pattern of the Cineplex 324 with facility ID 02-68 shows that the average dwelling time on a typical Sunday is 120 minutes, and the next destination varies based on the time the visitors leave the Cineplex. For the example given in FIG. 5, the most probable next destination after leaving Cineplex 324 will be food court or restaurant when the time is between 11:30 to 13:30, or apparel shops when the time is between 14:00-16:00, or MRT station/bus interchange when the time is after 22:00.

According to various embodiments, multiple occupancy patterns 320 may be generated for the same facility type, based on different visitor/customer groups. The visitor/customer group may be categorized by one or more of gender, age group or occupation. The information of gender and age group may be obtained from video camera or membership registration. For example, women are likely to spend longer time in apparel shops compared to men. In various embodiments, a unique occupancy pattern may also be learned or generated for a regular visitor to the multiple-facility building using Wi-Fi data by matching the MAC-ID of the mobile device.

Various embodiments of the occupancy pattern extractor 241 described in FIG. 5 are analogously valid for the occupancy pattern extractor 12, 107 above, and vice versa.

Figure 6:
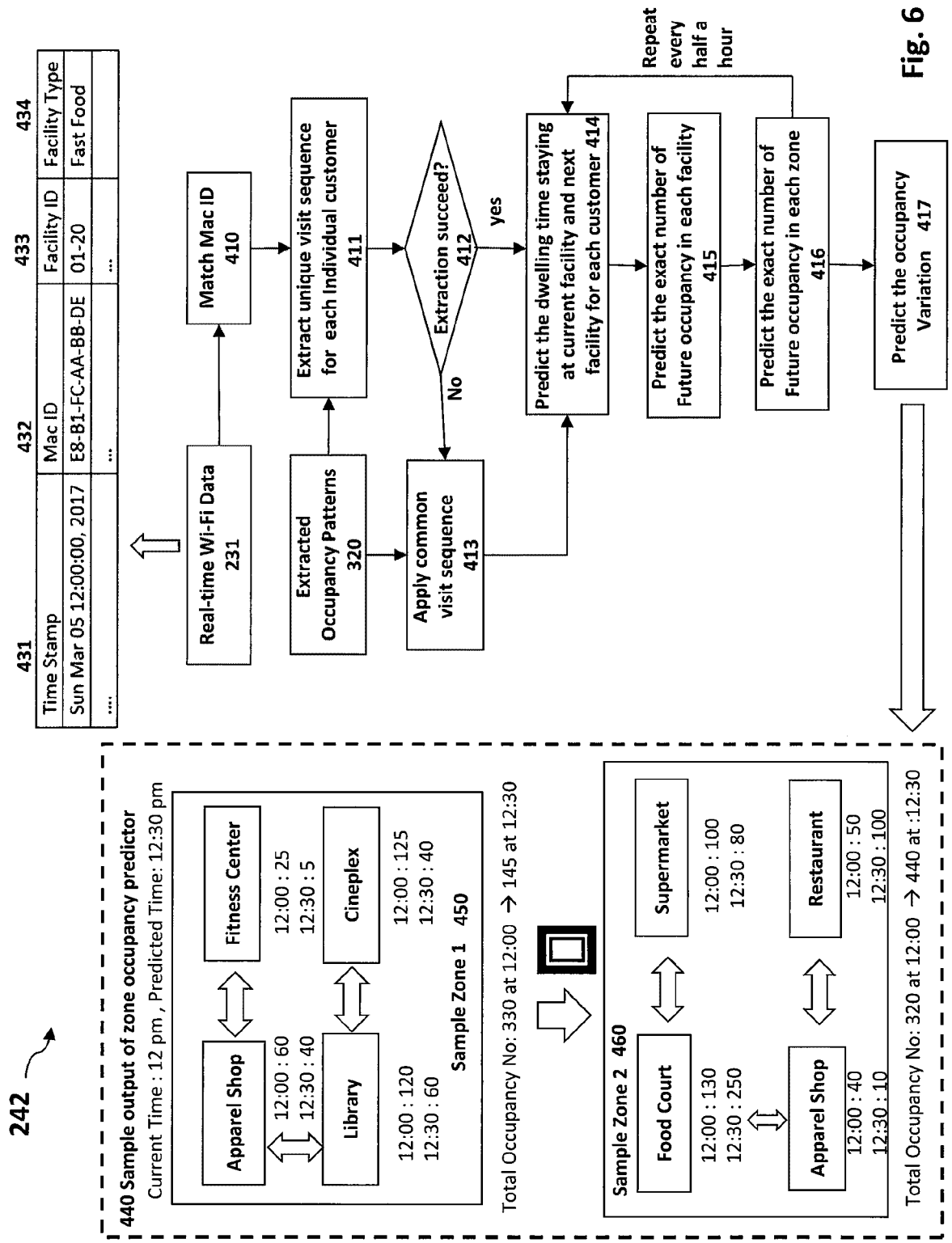
FIG. 6 shows a block diagram illustrating prediction of the zone level occupancy variation of the building in the zone occupancy predictor according to various embodiments.

FIG. 6 shows a block diagram illustrating prediction of the zone level occupancy variation of the building in the zone occupancy predictor according to various embodiments. The input data, process flow and output data for the zone level occupancy variation prediction due to high dynamic human flow are illustrated in the embodiments of FIG. 6. The prediction may be based on the real-time occupancy data 230 (for example, the real-time Wi-Fi data 231) and the extracted facility-based occupancy patterns 320.

The real-time Wi-Fi data 231 may include one or more of time stamp 431 when the visitor's device was detected, MAC-ID 432 of the visitor's device detected by the Wi-Fi router, Facility ID 433 where the visitor's device was detected, or Facility type 434 of the facility where the visitor's device was detected. For example, the first entry of the sample Wi-Fi data given in FIG. 6 shows that the MAC-ID "'E8-B1-FC-AA-BB-DE' is detected on Sunday in the noon period at 12:00 pm at facility 01-20, which is a fast food stall.

According to various embodiments, if the building to be controlled is a new building which may not have sufficient historical data for extracting the occupancy patterns for the facilities, the occupancy patterns of the most similar building from the collection of buildings existing in the building database may be applied to the new building. Such similar building may be found through various machine learning techniques, such as but not limited to decision trees, k-nearest neighbor, clustering etc. The similarity between buildings may be measured in terms of the static building spatial data, including but not limited to facility types 341, building dimension 342, floor plan 343 and location 344.

According to various embodiments, the zone occupancy predictor 242 may be configured to match detected MAC-ID of each individual customer with the extracted occupancy patterns 320 at 410, and to extract the unique visiting sequence for each individual customer at 411. For those non-regular customers, the extraction may fail at 412, and a common visiting sequence extracted from the occupancy patterns may be applied at 413. With the visiting sequence, the zone occupancy predictor 242 may be configured to predict the dwelling time staying at the current facility and the next facility for each individual customer at 414. The zone occupancy predictor 242 may further predict the exact number of future occupancy, e.g.: half an hour later, in advance for each facility at 415. The exact number of occupancy in each zone at half an hour later may be predicted at 416 by adding up the occupancy in each facility based on the floor plan previously obtained. The respective occupancy variation in each zone may be calculated by comparing the predicted future occupancy and the detected real-time occupancy 231 at 417. The zone occupancy predictor 242 may be configured to conduct this prediction process periodically, e.g. every half an hour, to track the occupancy accurately during periods of high dynamic human flow. According to various embodiments, the extracted occupancy patterns 320 and the real-time occupancy data 231 are used to keep predicting the future occupancy every fixed time interval (e.g.: every 0.5 hour). Accordingly, this zone occupancy prediction is carried out every predetermined time interval, and thus carries a real-time prediction effect for the dynamic human flow.

A block diagram 440 is shown as a sample output of the zone occupancy predictor 242 according to an exemplary embodiment. In this illustrative example, sample zone 1 450 may include 4 different facilities: apparel shop, fitness center, library and Cineplex, while sample zone 2 460 may include 4 different facilities: food court, supermarket, apparel and restaurant. The prediction is conducted at 12 pm by the zone occupancy predictor 242, to predict the occupancy variation at 12:30 pm due to human flow in a half hour period. Since it happened to be at lunch hour, the next destination of most facilities in zone 1 450 is either food court or restaurant according to their occupancy patterns. Therefore, the prediction shows that the occupancy of Fitness center, Library and Cineplex will significantly reduce, and this may lead to a reduction of the total occupancy in Zone 1 half an hour later. Meanwhile, since a large number of customers is predicted to move to Zone 2 460, where most restaurants and food court are located; the total occupancy of Zone 2 460 is going to increase significantly at 12:30 pm, although the occupancy in supermarket and apparel shops may also reduce.

In such a situation, the thermal load demand for zone 1 450 will gradually reduce, and the thermal load demand for zone 2 will gradually increase during the half hour period. Having the information of this trending in advance as determined by the zone occupancy predictor 242, the system 10, 100, 200 is able to take corresponding thermal load demand response by finding the new configurations in air distribution side and/or the cooling side (e.g.: chiller plant) to maintain the comfort level for each zone.

Figure 7:
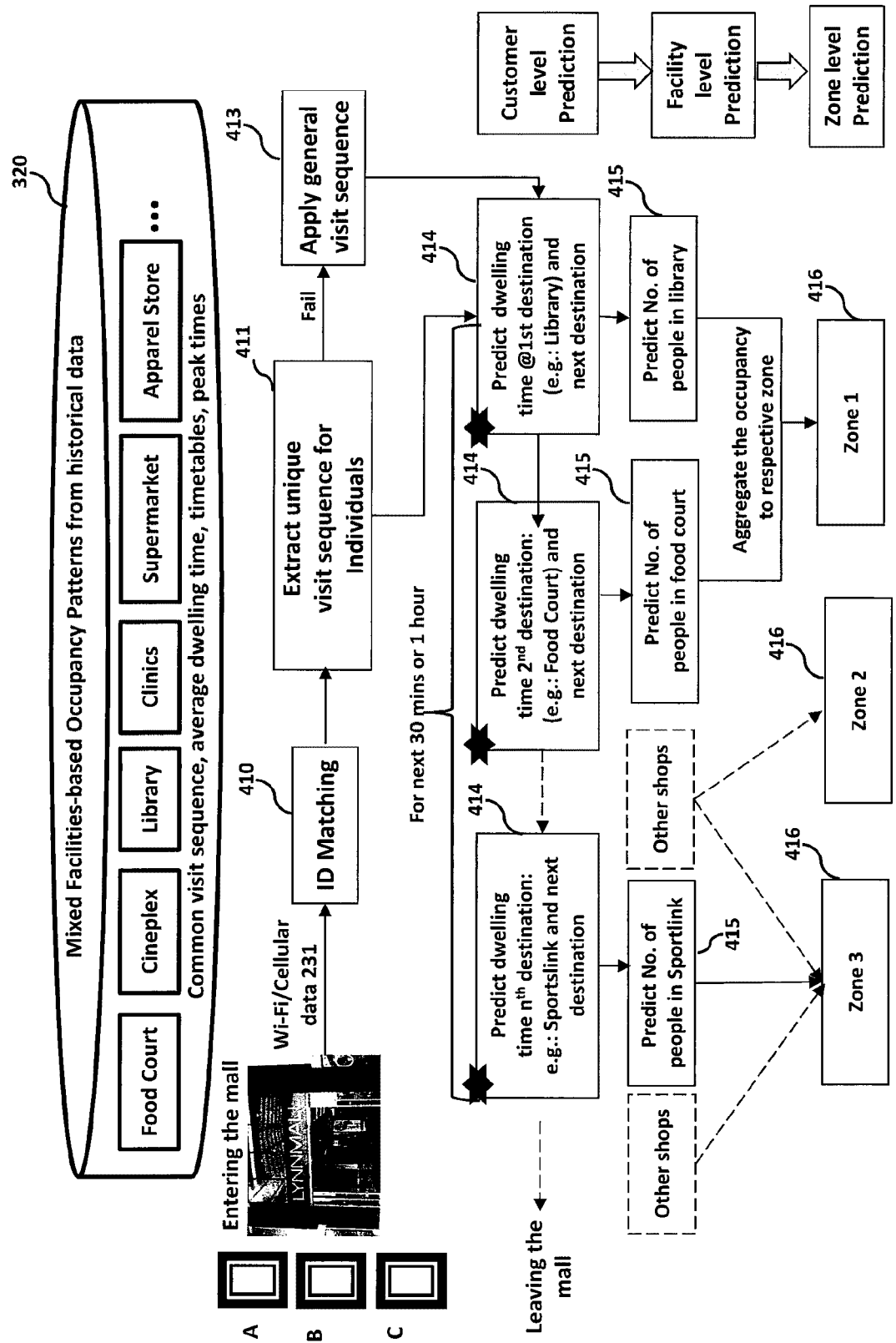
FIG. 7 shows an illustrative example of occupancy variation prediction performed by the zone occupancy predictor according to various embodiments.

FIG. 7 shows an illustrative example of occupancy variation prediction performed by the zone occupancy predictor 242 according to various embodiments.

The real-time Wi-Fi/Cellular data 231 may include one or more of time stamp 431, MAC-ID 432, Facility ID 433, or Facility type 434 when the visitor's device was detected, for example, when the visitors enter the mall via entrances A, B and C.

Based on the facility-based occupancy patterns 320 determined for a multiple-facility building, as well as real-time data, zone level occupancy and dwelling time for the next predetermined time period, e.g. next 30 minutes or next 1 hour, may be predicted. The prediction may be carried out, for example, according to various embodiments of FIG. 6 above, and may be performed by the zone occupancy predictor 242 or the zone occupancy predictor 14, 108, above.

The multiple-facility building may include various types of facilities, such as food court, Cineplex, library, clinics, supermarket, apparel store, etc. The facility-based occupancy patterns 320 may be determined according to various embodiments above, and may include one or more information of common visiting sequence, average dwelling time, timetables, peak times, etc.

According to various embodiments, the zone occupancy predictor 242 may be configured to match detected MAC-ID of each individual customer with the extracted occupancy patterns 320 at 410, and to extract the unique visiting sequence for each individual customer at 411. For those non-regular customers, the extraction may fail and a common/general visiting sequence extracted from the occupancy patterns 320 may be applied at 413. With the visiting sequence, the zone occupancy predictor 242 may be configured to predict the dwelling time staying at the current facility and the next facility for each individual customer at 414, which is a customer level prediction. The zone occupancy predictor 242 may further predict the number of future occupancy, e.g.: half an hour later, in advance for each facility at 415, which is a facility level prediction. The number of occupancy in each zone (e.g., zone 1, zone 2 and zone 3) at half an hour later may be predicted at 416 by adding up the occupancy in each facility within the zone based on the floor plan previously obtained. The respective occupancy variation in each zone may be calculated by comparing the predicted future occupancy and the detected real-time occupancy 231. The predicted zone occupancy and zone occupancy variation may be used to control the respective AHU configurations for each zone.

Various embodiments of the zone occupancy predictor 242 described in FIG. 6 and FIG. 7 are analogously valid for the zone occupancy predictor 14, 108 above, and vice versa.

Figure 8:
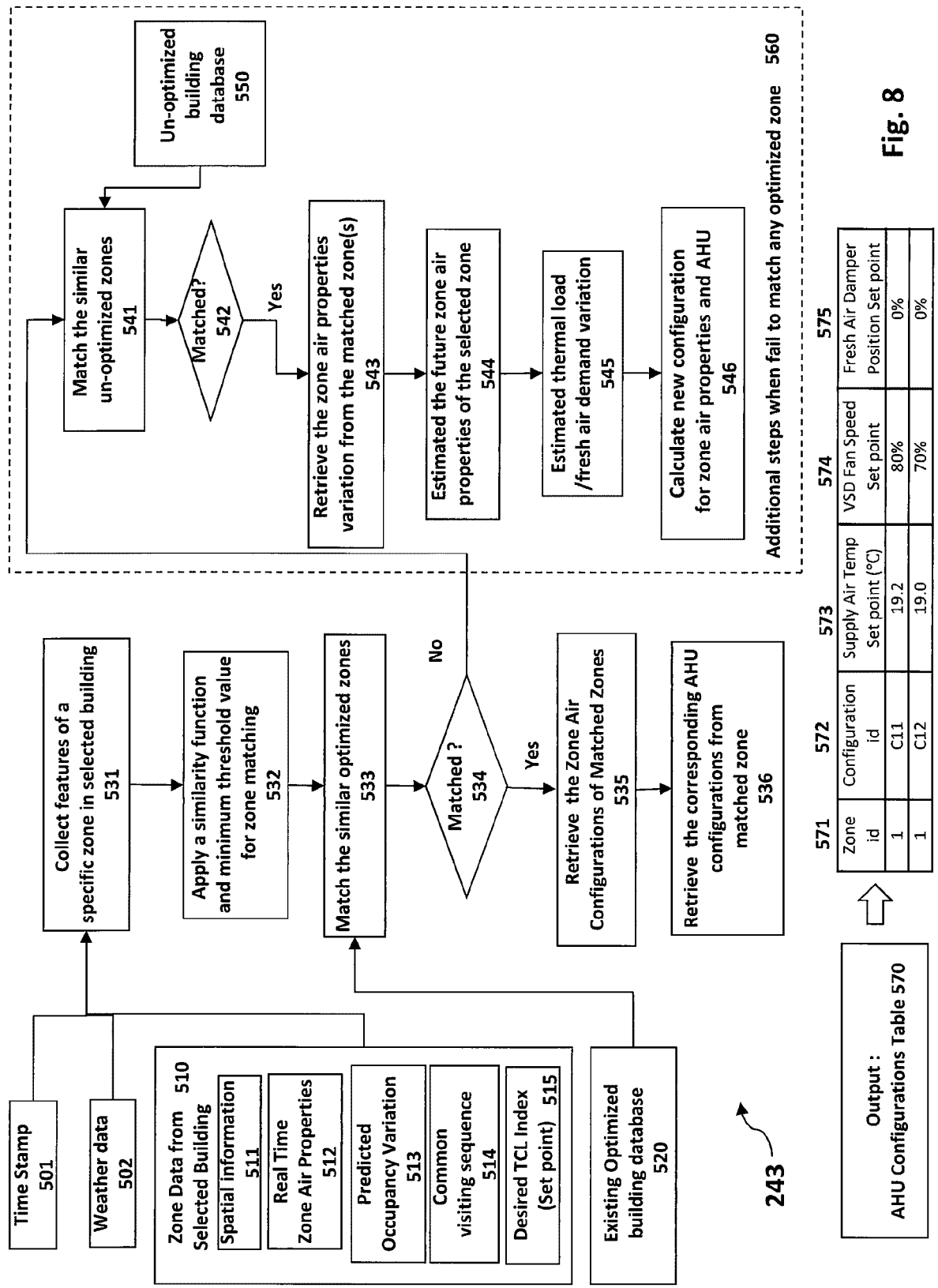
FIG. 8 shows a block diagram illustrating matching of similar zones in a specific time range from the historical building databases in the similar zone matcher according to various embodiments.

FIG. 8 shows a block diagram illustrating matching of similar zones in a specific time range from existing optimized building database 520 or un-optimized building database 550 in the similar zone matcher 243 according to various embodiments. The existing optimized building database 520 and the un-optimized building database 550 may be included in the historical building database described in the embodiments of FIG. 1 and FIG. 2 above, which may be the historical BMS database 141, 270, for example. The optimized building database 520 may include data of optimized buildings and partially optimized buildings. The input data, process flow and output data for matching the similar zones and obtaining potential air side configurations from the historical data of similar zones are illustrated in the embodiments of FIG. 8.

The similar zone matcher 243 may be configured to perform the matching process based on the predicted occupancy variation 513 from the zone occupancy predictor 242. To increase the accuracy of the zone matching, the features used by the similar zone matcher 243 may further include but are not limited to one or more of current time stamp 501, weather data 502, and detailed zone data 510 from the building to be controlled. Time stamp 501 indicates the time range, e.g.: 12:00 pm to 12:30 pm. Weather data 502 includes both current and future weather condition. The zone data 510 includes but is not limited to the following features: zone spatial information 511, real time zone air properties 512 from sensors, predicted occupancy variation 513 from zone occupancy predictor 242, common visiting sequence 514 of the facilities within the zone, and desired TCL index 515.

After the relevant features/data have been collected in step 531, a specific similarity measure and a minimum threshold value may be applied by the similar zone matcher 243 for zone matching at step 532. An effective similarity measure is essential for the zone matching process, and it may mainly depend on how the features are represented. One of the possible feature representations is explained in details using a sample example in FIG. 9 below. In various embodiments, examples of the similarity measures or functions used for the matching may include Euclidean distance, cosine similarity, etc. Only the zones for which the obtained similarity value is higher than the minimum threshold will be considered as matched. According to some embodiments, the minimum threshold value may be a predefined numeric value between 0 and 1 set by the users, for example, by the building owner and the facility manager. Alternatively, the user may also input a numeric integer value to indicate the zone matcher 243 retrieving a fix number of most similar zones by ranking the similarity values. Various types of techniques may be used to match the similar zones from existing optimized building database 520 in step 533, such as machine learning, heuristic approaches, or physical models. If there are one or more zones in the optimized building database 520 that matches in step 534, the zone air configurations and/or equipment configurations may be determined for the specific zone in the selected building based on the matched zones, for example, the corresponding configurations for zone air properties and/or equipment (e.g.: AHU) configurations of the matched zones in historical BMS data records may be automatically retrieved at 535, 536 by the similar zone matcher 243.

A sample output 570 shows that, each AHU configuration record may include a plurality of elements/features: Zone ID 571, Configuration ID 572, Supply Air Temperature Set point 573, VSD (variable speed drive) Fan Speed Set point 574, and Fresh Air Damper Position Set point 575. In an illustrative example, two similar zones have been successfully matched in the database for zone 1 of the selected building. The optimized AHU configurations for these two matched zones are retrieved from the BMS database, and stored as C11 and C12 in the system, respectively. For C11, the set point of supply air temperature 573 is set at 19.2° C., the set point of the variable speed drive 574 for controlling the fan speed is at 80% of full speed, and the set point of fresh air damper position is at 0% of fully open. C11 and C12 may be considered as the potential configurations for zone 1 for optimization purpose.

According to various embodiments, there may be no existing optimized zone matched in the database 520. For such a situation, additional steps 560 may be carried out for a specific un-optimized zone when it fails to match any optimized zones. The similar zone matcher 243 is further configured to match the similar un-optimized zones from another un-optimized building database 550 at 541, which may include the historical BMS data records and building spatial data of a number of un-optimized buildings or un-optimized zones of pre-configured buildings. When a match is determined at 542, the variation of zone air properties observed from the corresponding matched zones will be retrieved at 543 and used as references to estimate or project the upcoming variation of the selected zone air properties, e.g. at half an hour later, at 544. Simple physical models based on the HVAC principle such as proportional projection may be applied, or it may be a simple average of those referred zone air properties variation, when more than one zone can be matched from the database 550. Based on the estimated future zone air properties, the similar zone matcher 243 estimates the corresponding variation on thermal load demand and/or fresh air demand at 545, and calculates the new configuration of zone air properties and supply air properties (e.g.: AHU configuration) at 546, e.g. using the formula of the HVAC System.

Figure 9:
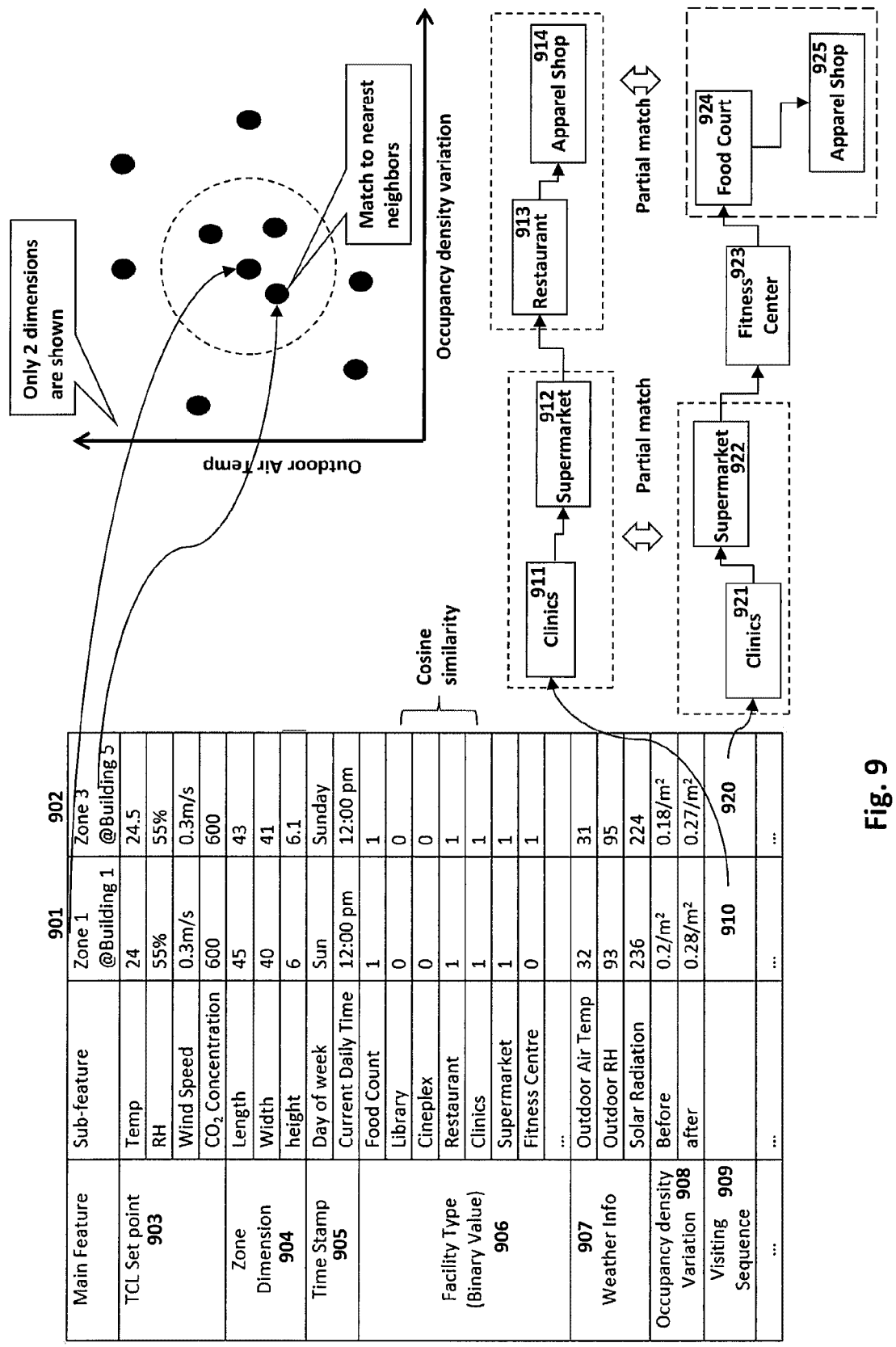
FIG. 9 shows an example illustrating the similar zone matching through an appropriate feature representation and similar measure as performed by the similar zone matcher according to various embodiments.

FIG. 9 shows an example illustrating the similar zone matching through an appropriate feature representation and similar measure as performed by the similar zone matcher 243 according to various embodiments. In this illustrative example, the feature representations 901, 902 of two sample zones: zone 1 in building 1 and zone 3 in building 5, are presented in the table of FIG. 9. Building 1 is the selected building to be optimized or configured), and building 5 is an optimized building from the historical database. The main feature taken into account for comparing the zone similarity may include the occupancy variation 908. Further main features which may be taken into account for comparing the zone similarity may include but are not limited to one or more of the time stamp 905, the set point of thermal comfort level (TCL) 903, the zone dimension information 904, facility types 906, common visiting sequence 909 of the facilities within the zone, and the change of weather condition 907.

Each of the main features may include a few sub-features. For example, the set point of thermal comfort level 903 may include zone air temperature (Temp), relative humidity (RH), wind speed and $CO_2$ concentration. A numeric value may be assigned to each of the sub-features. The time stamp 905 may include day of the week and a daily time record. For Facility type 906, each available facility type, like library, Cineplex, supermarket, fitness center, may be a sub-feature. Binary value is assigned to each specific sub-feature to indicate the existence. In an exemplary embodiment, facility type of a zone may be represented in a sparse binary vector, and the similarity between the facility types of two different zones may be measured by various methods, such as cosine similarity, or account the number of sub-feature having different values. Some of the main features like the occupancy density variation 908 are time-series data, wherein the value at current time stamp and the predicted time stamp must be taken into account. The similarity between the common visiting sequences in two different zones may be measured by n-gram based matching. n can be any positive integer value larger than or equal to 2. In the example shown in FIG. 9, the visiting sequence 910 of zone 1 obtains two partial matches i.e.: clinics 911/921 to supermarket 912/922 and food court/restaurant 913/924 to apparel shops 914/925, with the visiting sequence 920 of zone 3, when n is set to 2. Then a similarity value may be calculated based on the number of partial matches.

According to various embodiments, the similar zone matcher 243 may be configured to find the most similar zones by various machine learning techniques, such as k nearest neighbor, as illustrated in FIG. 9.

Figure 10:
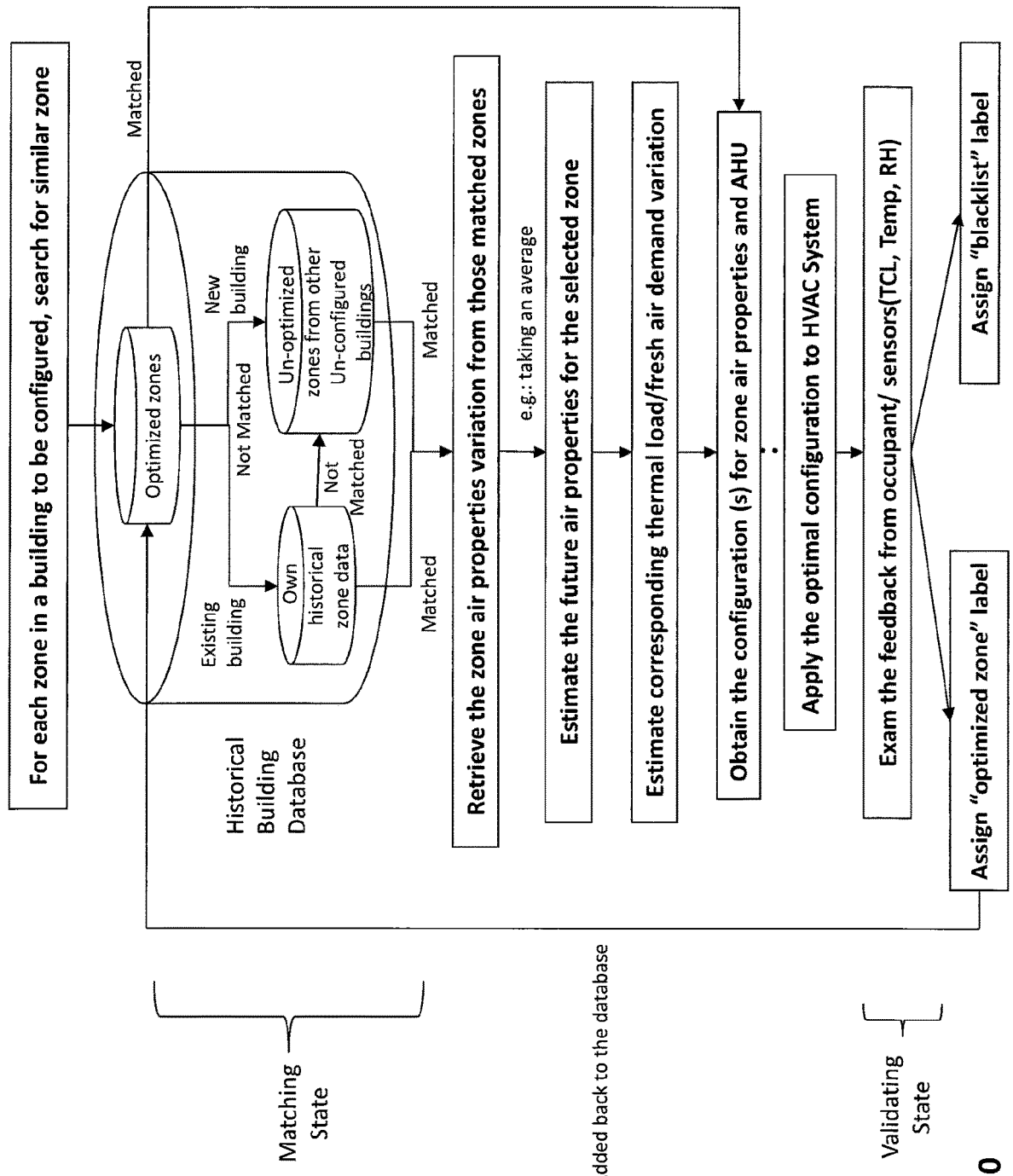
FIG. 10 illustrates a process carried out by the similar zone matcher to learn new configurations if a match with optimized zones fails according to various embodiments.

FIG. 10 illustrates a process carried out by the similar zone matcher 243 to learn new configurations if a match with optimized zones fails according to various embodiments.

As shown in FIG. 10, for each zone in a selected building to be configured or optimized, a matching state and a validating state are carried out. The similar zone matcher 243 is initially configured to search for similar zones, e.g. by k nearest neighbor (KNN), from optimized zones in the historical building database. When a match is found, the similar zone matcher 243 proceeds to obtain the zone air properties and AHU configurations of the matched zones.

If a match with optimized zone is not found, the similar zone matcher 243 is configured to determine whether there is a match with own historical data of the existing building. If a match is not found, the similar zone matcher 243 proceeds to determine whether there is a match with un-optimized zones from other un-configured buildings which may be new buildings. If a match with own historical data or with un-optimized zones is found, the similar zone matcher 243 is configured to retrieve the zone air properties variation from the matched zones, and to estimate the future air properties for the selected zone, e.g., by taking an average of the retrieved zone air properties. The similar zone matcher 243 is further configured to estimate corresponding thermal load variation or fresh air demand variation, and obtain the zone air properties and AHU configurations based on the estimation.

The configuration validator 254 may be configured to apply the optimal configuration to the HVAC system, and examine the feedback from the occupants or the sensors. When a positive feedback is obtained, the zone may be assigned with a label of "optimized zone" and may be stored in the database of optimized zones. When a negative feedback is obtained, a "blacklist" label may be assigned to the zone.

Various embodiments of the similar zone matcher 243 described in FIGS. 8-10 above are analogously valid for the similar zone matcher 16, 109 above, and vice versa.

Figure 11:
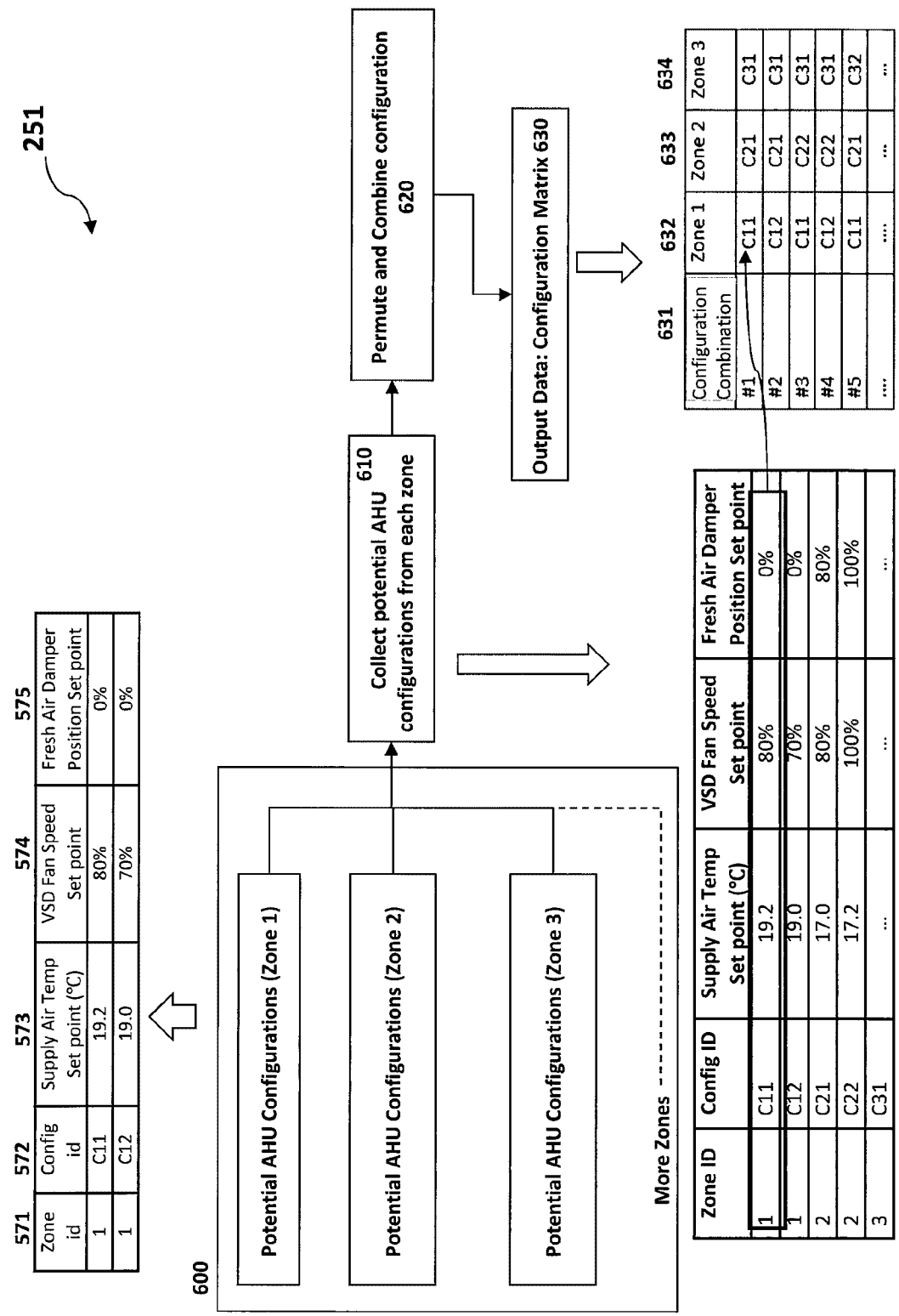
FIG. 11 shows a block diagram illustrating generation of all potential configuration combinations for the entire building in the configuration generator according to various embodiments.

FIG. 11 shows a block diagram illustrating generation of all potential configuration combinations for the entire building in the configuration generator 251 according to various embodiments. The input data, process flow and output data for generating all possible zone level configuration combinations are illustrated in the embodiments of FIG. 11.

The configuration generator 251 may be configured to generate the configuration combinations by taking the potential AHU configurations 600 for each zone obtained from the similar zone matcher 243 as input. The configuration generator 251 collects potential AHU configurations for each zone at 610, and permutes and combines all these zone configurations at 620. The configuration generator 251 integrates all possible combinations among all the zones of the building to determine a configuration matrix 630 including a plurality of configuration combinations, wherein each configuration combination include one of the potential AHU configurations for each zone.

A sample configuration matrix is shown in FIG. 11. Assuming there are 3 zones in the building. Two potential configurations have been assigned to both zone 1 632 and zone 2 633, namely C11 and C12 for zone 1, and C21 and C22 for zone 2. There are three potential configurations for zone 3 634, i.e. C31, C32 and C33, wherein only C31 is shown in the table including the collected configurations. Accordingly, there will be 2*2*3, in total 12 sets of zone configuration combinations in the matrix 630, and the ID 631 indexes from 1 to 12.

Various embodiments of the configuration generator 251 described in FIG. 11 above are analogously valid for the configuration generator 18, 116 above, and vice versa.

Figure 12:
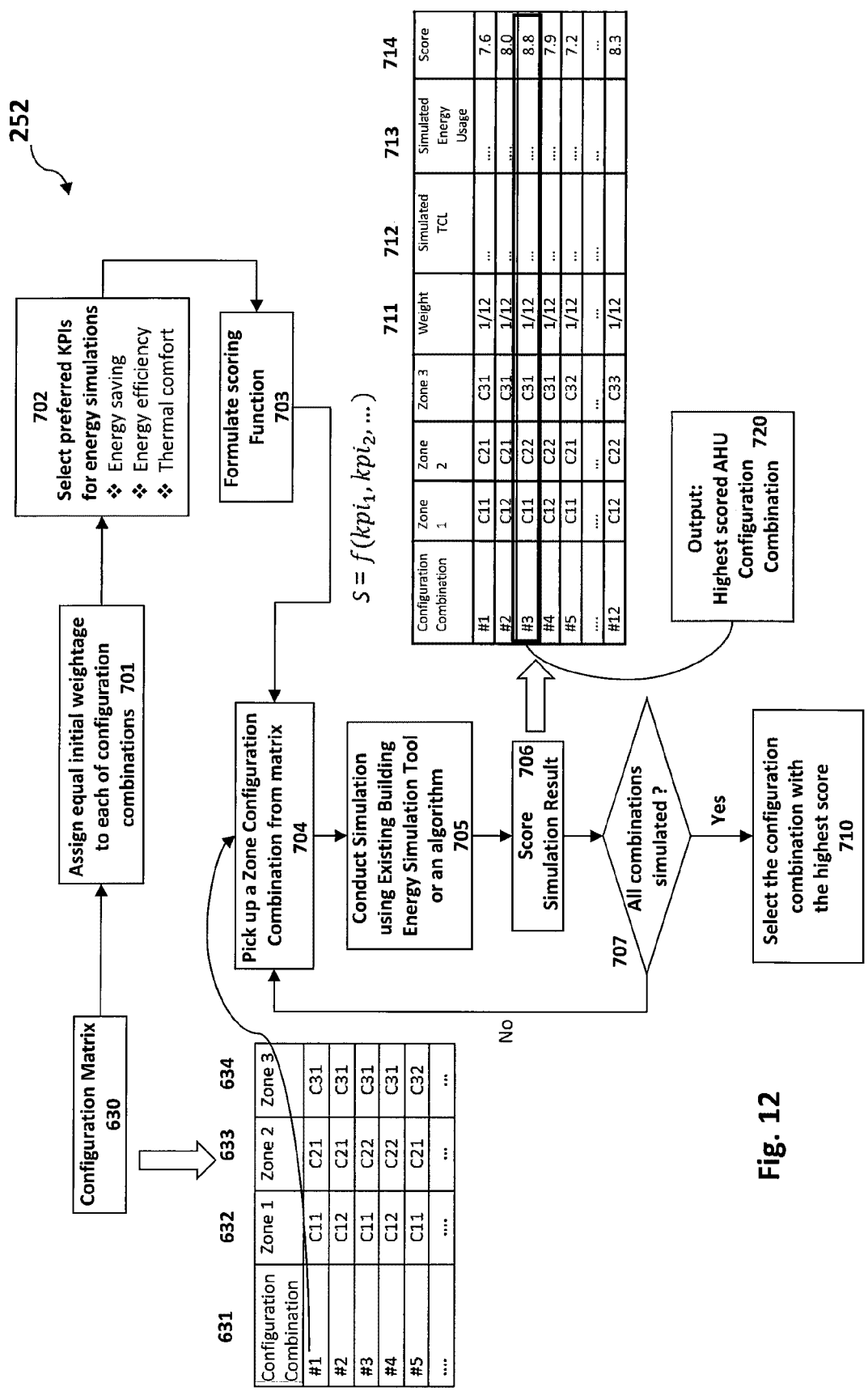
FIG. 12 shows the system components of the air side optimizer utilized for finding the best set of zone configuration combination for the optimization/control of the entire building.

FIG. 12 shows the system components of the air side optimizer 252 utilized for finding the best set of zone configuration combination for the optimized control of the entire building. The input data, process flow and output data for choosing the bet combination of zone level configurations are illustrated in the embodiments of FIG. 12. This optimization is performed by simulating and scoring each set of configuration combinations.

The configuration matrix 630 obtained in FIG. 11 may be used as the input, and the air side optimizer 252 assigns an equal initial weightage to each of the configuration combinations at 701. This weightage indicates the confidence level of achieving the actual optimization during the real implementation stage. The weightage of the applied configuration combination will be adjusted based on the effectiveness evaluation of the actual KPI achieved. The user may input the key performance indicators (KPI) for evaluating the configuration combinations based on personal preference at 702. The KPIs may include but are not limited to energy saving, energy usage, energy efficiency, thermal comfort etc. The air side optimizer 252 may formulate a scoring function at 703. In an embodiment, a polynomial scoring function may be used when multiple KPIs have been selected by the user. The polynomial may be a function of the selected KPIs. This function can be either linear or non-linear, which depends on user's preference and understanding on difference KPIs.

The air side optimizer 252 is configured to pick up each record in the configuration matrix 630 at 704, and input the selected configuration combination into an existing building energy simulation tool or an algorithm at 705 to simulate the values of KPIs selected in 702. The air side optimizer 252 calculates a final score of the configuration combination using the simulated KPIs and the polynomial scoring function at 706. The simulation is performed for all configuration combinations at 707 and when all the configuration combination records in the matrix 630 have been simulated, the air side optimizer 252 selects the one with the highest score as the output of the air side optimizer 252 at 710. The configuration combination with the highest score is output as the optimal configuration combination.

FIG. 12 also shows an example 720 of selecting the optimal configuration combination by the air side optimizer 252. Column 711 indicates the equal initial weight assigned to each of the configuration combinations. In this example, thermal comfort level (TCL) 712 and energy usage 713 are the KPIs pre-selected by the user. The closer the simulated TCL to the desired TCL requirement 222, the higher the score. The lesser the output energy of the simulation, the higher the score. The final scores 714 of 12 configuration combinations for AHU are listed in the last column 714. Among them, the $3^{rd}$ configuration combination which includes C11 for Zone 1, C22 for Zone 2 and C31 for Zone 3 has achieved the highest score of 8.8 during the simulation & scoring computation. Therefore, this configuration combination will be selected by the air side optimizer 252 as the new air side configuration to be set for the entire building.

Various embodiments of the air side optimizer 252 described in FIG. 12 above are analogously valid for the air side configuration optimizer 20, 117 above, and vice versa.

Figure 13:
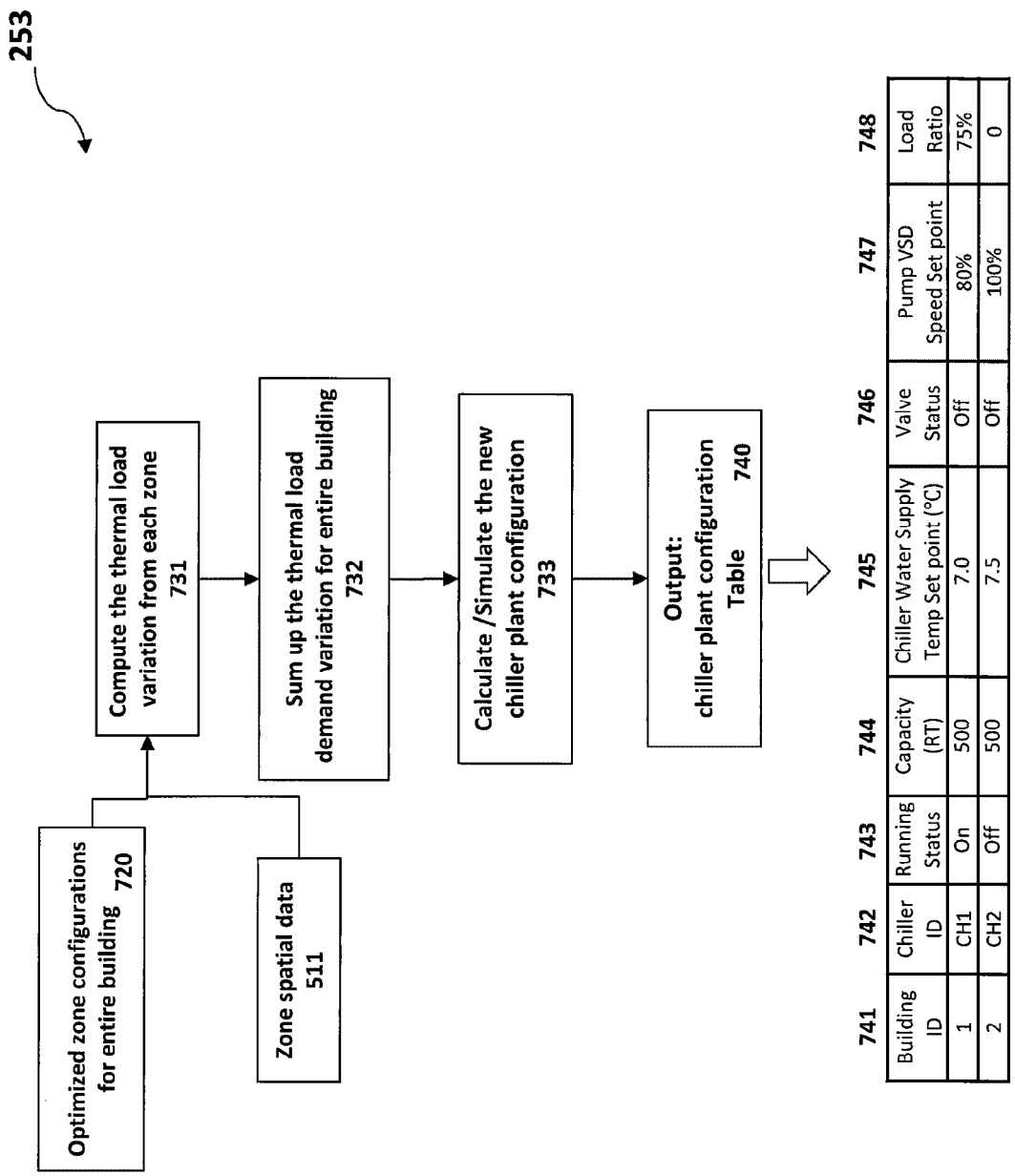
FIG. 13 shows the system components utilized for calculating the optimal chiller plant configuration in the chiller plant optimizer according to various embodiments.

FIG. 13 shows the system components utilized for calculating the optimal chiller plant configuration in the chiller plant optimizer 253 according to various embodiments. The input data, process flow and output data for computing the corresponding new configuration setting of the chiller plant are illustrated in the embodiments of FIG. 13.

The chiller plant optimizer 253 may be configured to use the output 720 of the air side optimizer 252 and zone spatial data 511 to compute the amount of thermal load variation of each zone at 731. The thermal load variation of the entire building is obtained by adding the zone level values at 732, to determine how much the additional load or reduced load demand the chiller plant system needs to respond. Based on this value, the new chiller plant set points can be calculated simulated using physical model or a simulation tool or an algorithm at 733, and output as the optimized chiller plant configuration 740.

An example of a water-cooled chiller plant system configuration is also shown in FIG. 13. According to various embodiments, the water-cooled chiller plant system is the most common equipment used for providing cooling load for a multiple facility building, like shopping malls. The optimal chiller plant configuration 740 for the water-cooled chiller plant system may include Building ID 741, Chiller ID 742, Running Status 743 of chiller, Design Capacity 744, Chiller water supply temperature set point 745, valve status 746, VSD set point for chilled water pump 747, and the actual operating load ratio 748 to the design capacity 744. The sample output table 740 shows the new optimal configuration setting for 2*500 RT chiller plant. In order to respond to the future cooling load demand of building 1 (500*75%=375 RT), the system may run Chiller 1 only, at 7° C. of supply water temperature, with a closed bypass valve and chilled water pump speed at 80% of the full speed of VSD.

Various embodiments of the chiller plant optimizer 253 described in FIG. 13 above are analogously valid for the chiller plant optimizer 118 above, and vice versa.

Figure 14:
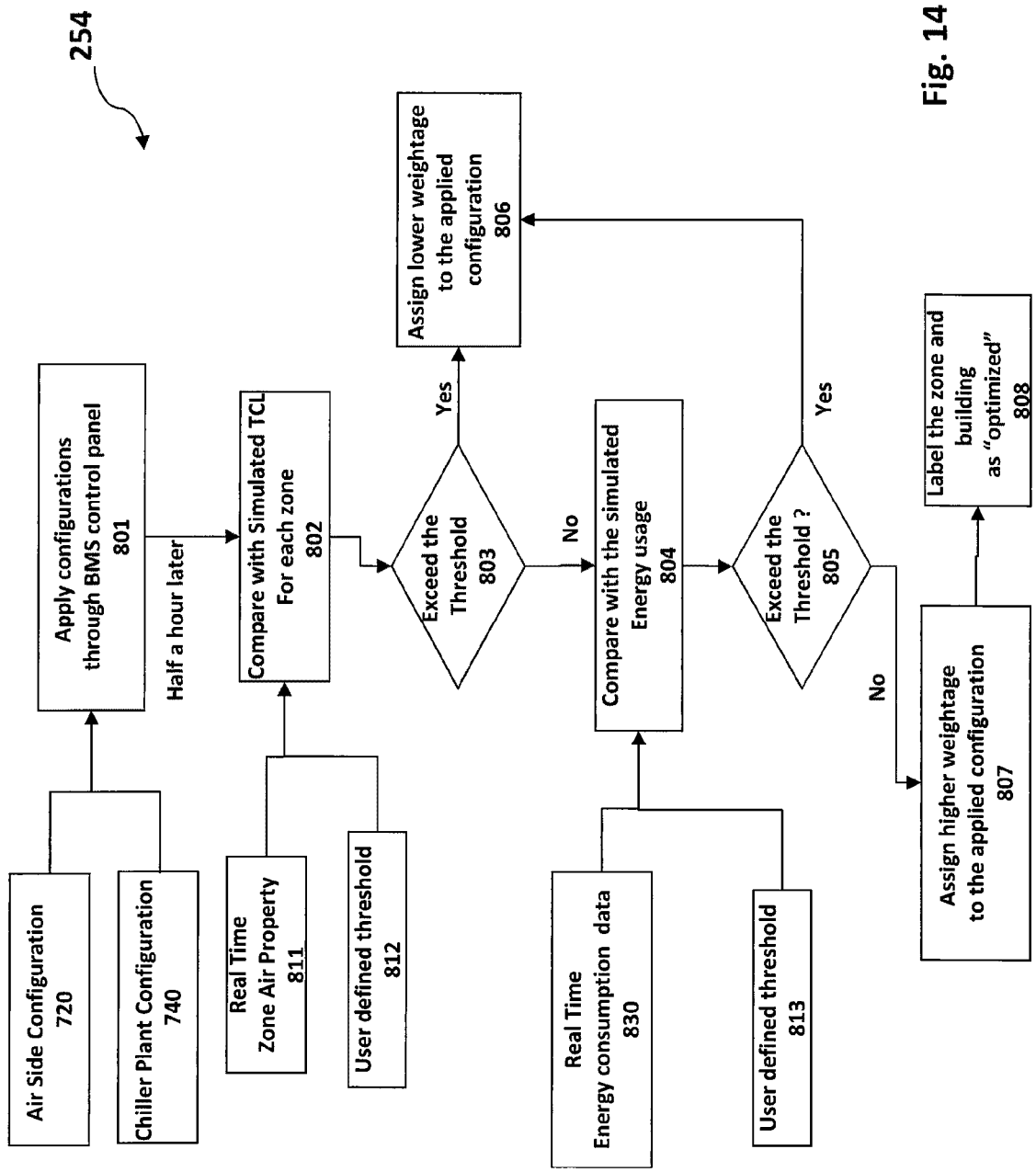
FIG. 14 shows the system components of the configuration validator utilized for validating the effectiveness of configurations obtained from both the air side optimizer and chiller plant optimizer according to various embodiments.

FIG. 14 shows the system components of the configuration validator 254 utilized for validating the effectiveness of configurations 720, 740 obtained from both the air aide optimizer 252 and chiller plant optimizer 253 according to various embodiments. The input data, process flow and output data for validating the effectiveness of applied configurations are illustrated in the embodiments of FIG. 14.

After both configurations 720, 740 have been implemented together through the BMS control panel in step 801 for a certain time period, e.g.: half an hour, the configuration validator 254 may collect the actual zone air properties 811 from the sensors including but not limited to temperature sensor, humidity sensor, air flow meter and $CO_2$ sensor, and compare with the simulated thermal comfort level 712 in step 802. If the difference between the actual readings and the simulated values is determined to exceed the user defined threshold 812 at 803, the configuration validator 524 will calculate a lower weightage 711, and assigns it back to the applied configuration in output table 720 in step 806, as the configuration does not achieve the requirement of the selected KPIs, and the building remains at un-optimized state. The new weightage value can be calculated by subtracting a normalized residual from the initial weightage, and the residual can be calculated by a normalized "distance" between the achieved TCL and the desired TCL. If the TCL is met, the configuration validator 254 collects real time readings from power meters 830, and compares the actual energy usage with the simulated energy usage 713 at 804. Similarly, if the difference between the actual reading and simulated values exceeds the user defined threshold 813 in step 805, the configuration validator 254 also goes to step 806. Only when both threshold values are met, the effectiveness of the applied configuration is considered successfully validated, a higher weightage will be calculated and assigned to it in step 807, and the entire building and zones are labeled as "optimized" in step 808. Similarly, the new weightage value can be calculated by adding a normalized similarity value between the achieved KPI and the desired KPI value. In the future, if the same configuration combination can be retrieved from the zone matching process, the simulation process may be skipped and the one with highest weightage will be directly applied to the zones of the building to be configured or optimized.

Through a continuous optimization process time to time, several buildings in the un-optimized or partially optimized state will move to an optimized state gradually. Therefore, various embodiments are not only able to optimize a single multiple facilities building, but also optimize a large collection of buildings based on the mutual information.

Various embodiments of the configuration validator 254 described in FIG. 14 above are analogously valid for the configuration validator 119 above, and vice versa.

Figure 15:
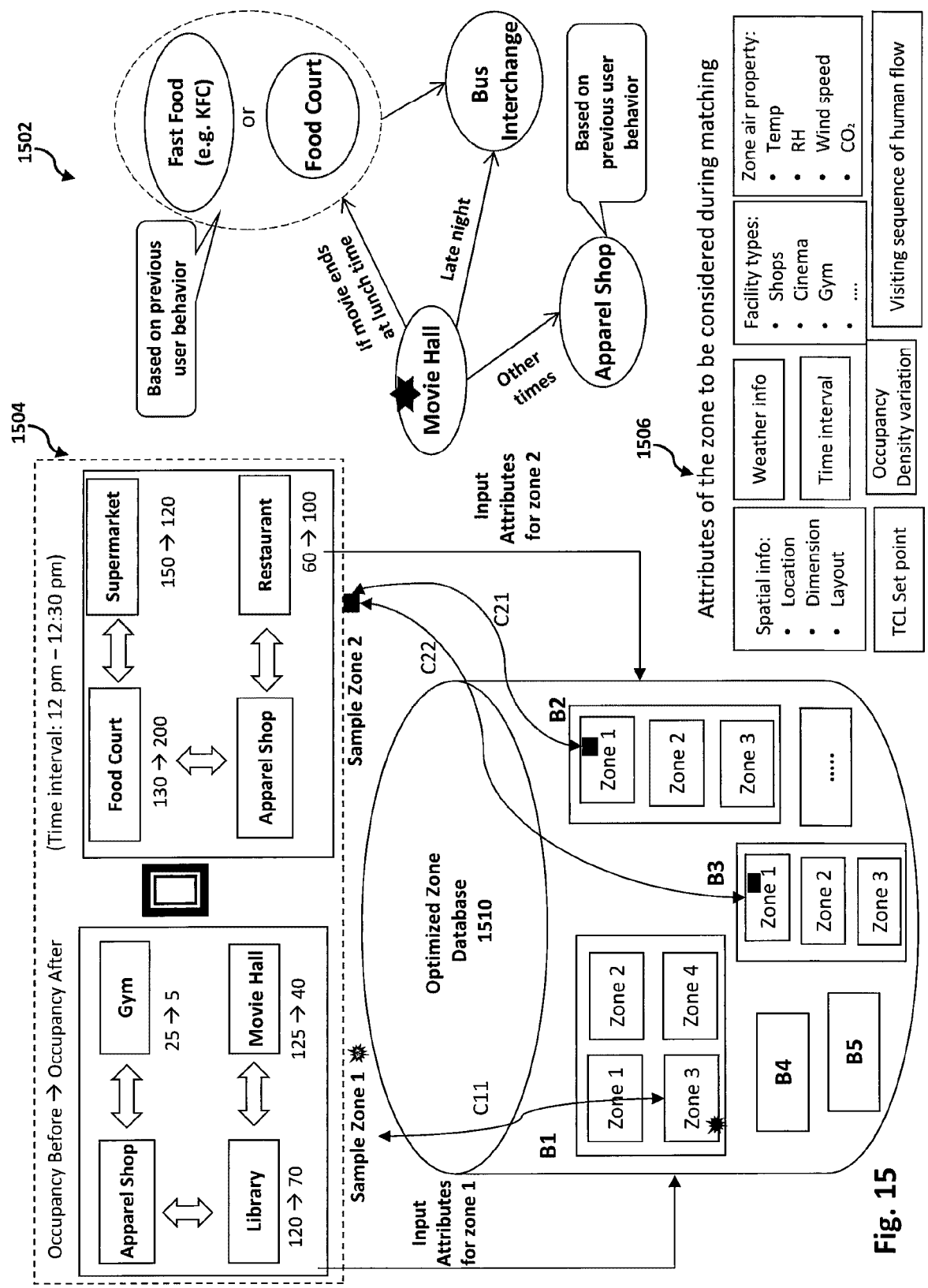
FIG. 15 shows a diagram illustrating a similar zone matching according to various embodiments.
Figure 16:
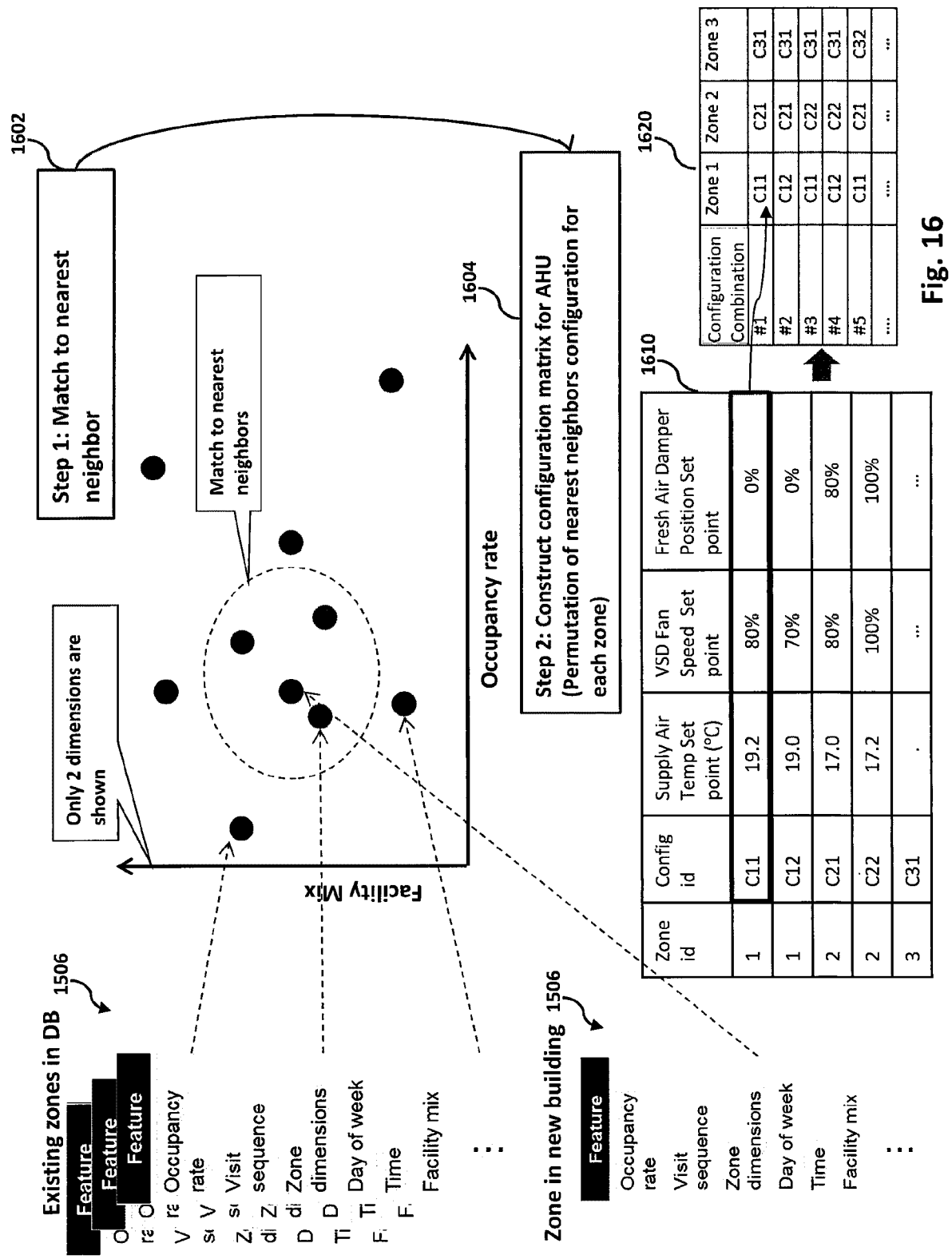
FIG. 16 shows a diagram illustrating generation of configuration matrix according to various embodiments.
Figure 17:
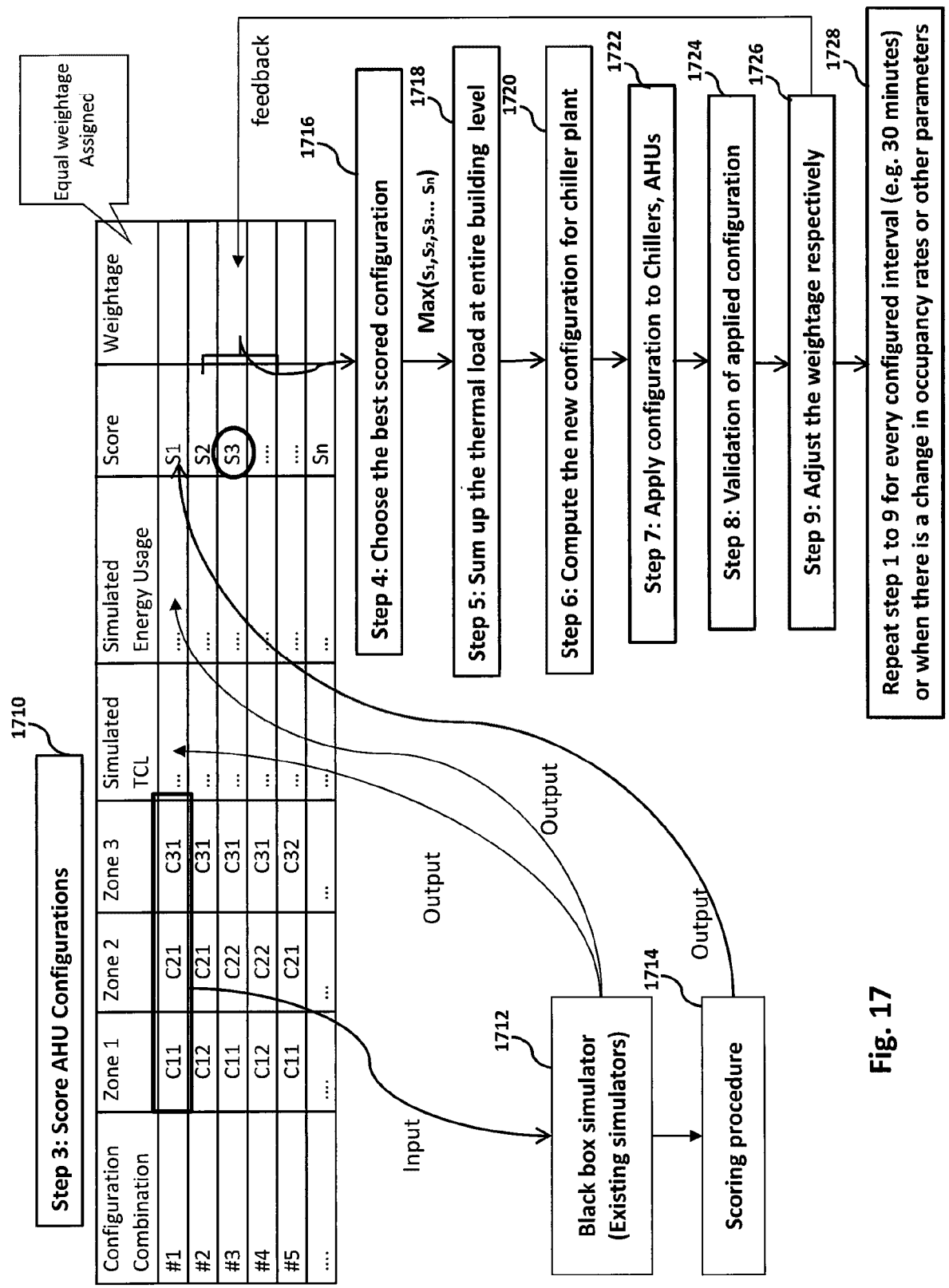
FIG. 17 shows a diagram illustrating configuration optimization based on the generated configuration matrix according to various embodiments.

FIGS. 15-17 illustrates various stages of building control according to the system and method of various embodiments.

FIG. 15 shows a diagram illustrating a similar zone matching according to various embodiments.

The facility-based occupancy pattern 1502 generated based on previous user behavior is shown, which may be generated by the occupancy pattern extractor 241 according to various embodiments of FIG. 5 above. The facility-based occupancy pattern 1502 may indicate the various time and dwelling time staying at various facilities, from which visiting sequence of human flow and future occupancy variation may be determined.

The predicted zone occupancy variation 1504 is shown, which may be predicted based on the facility-based occupancy pattern 1502, by the zone occupancy predictor 242 according to various embodiments of FIG. 6 above. In the example shown in FIG. 15, the zone occupancy variation 1504 indicates the change of zone occupancy in sample zone 1 and sample zone 2 in the time period of 12 pm-12:30 pm, in other words, the occupancy variation in the two zones at 12:30 pm may be predicted in advance at 12 pm.

Based on predicted zone occupancy variation 1504, the similar zones from an optimized zone database 1510 may be determined for the sample zone 1 and the sample zone 2, respectively. The optimized zone database 1510 may be or may be included in the historical building database described above. As illustrated in the example of FIG. 15, various zones of various pre-configured buildings B1, B2, B3, B4, B5, etc. are included in the database 1510. One or more of attributes 1506 of the zone which may be considered during the similar zone matching may include spatial information, weather information, time interval, facility types, zone air properties, TCL set point, occupancy density variation, sequence of human flow according to various embodiments.

As shown in FIG. 15, the similar zone matched for sample zone 1 is zone 3 of the building B1, and the corresponding AHU configuration C11 of the zone 3 may be retrieved for sample zone 1. The similar zones matched for sample zone 2 include zone 1 of the building B2 and zone 1 of the building B3, and the corresponding AHU configurations C21 and C22 of the matched zones may be retrieved for sample zone 2.

FIG. 16 shows a diagram illustrating generation of configuration matrix according to various embodiments.

In step 1 at 1602, zone matching is carried out according to the embodiments of FIG. 15 above. The zone matching may be carried out based on one or more of the attributes 1506 of the existing zones in the database 1510 and one or more of the attributes 1506 of the zone in the new building to be controlled, using a nearest neighbor algorithm. Only two dimensions of the features are shown in FIG. 16, and the dimensions may be less than or more than two depending on the number of attributes used for the zone matching. The configurations of the matched zones are retrieved and assigned to each corresponding zone of the building to be controlled, as shown in the table 1610.

In step 2 at 1604, the configuration matrix (e.g. for AHU) is constructed or generated, for example, by permutation of nearest neighbors configurations for each zone. The configuration matrix may be generated by the configuration generator 18, 116, 251 above, which may carry out the generation according the embodiments of FIG. 11. An example the generated configuration matrix 1620 is shown, which includes a plurality of configuration combinations, wherein each configuration combination includes one of the determined configurations for each zone.

FIG. 17 shows a diagram illustrating configuration optimization based on the generated configuration matrix according to various embodiments.

In step 3 at 1710 after the step 2 of FIG. 16 above, the configuration combinations, e.g. AHU configuration combination, in the configuration matrix 1620 is scored based on one or more predetermined key performance indicators (KPI). In this exemplary embodiment, two KPIs are selected, including TCL and energy usage. For each configuration combination, simulation is carried out in a black box simulator 1712 (e.g. existing simulators), which may output the simulated TCL and simulated energy usage. Based on the simulated TCL and simulated energy usage for each configuration combination, scoring procedure 1714 is carried out to determine a score for each configuration combination.

In step 4 at 1716, the best scored configuration combination, e.g. the highest scored combination, is chosen as the optimal configuration combination for building. The step 3 and step 4 may be carried out according to the embodiments of FIG. 12 above. The plurality of configuration combinations may be initially assigned with equal weightage.

In step 5 at 1718, the thermal load variation estimated for the plurality of zones may be sum up at the entire building level. In step 6 at 1720, the new chiller plant configuration may be determined based on the thermal load variation. The step 5 and step 6 may be carried out according to the embodiments of FIG. 13 above.

In step 7 at 1722, the chosen configuration combination for the AHU and the determined configuration for the chiller plant may be applied to the building. The applied configuration may be validated in step 8 at 1724, e.g. after the configurations have been applied for a predetermined time period. The validation may be evaluate the effectiveness of the applied configurations by comparing with a user-defined threshold. Based on the validation result, the weightages for the applied configuration combination may be adjusted in step 9 at 1726. Steps 7-9 may be carried out according to various embodiments of FIG. 14 above.

At 1728, the above-described steps 1 to 9 may be repeated for every predetermined time interval, e.g. every 30 minutes, or when there is a change in occupancy rates or other parameters. In this manner, the configurations for controlling the building may be optimized and updated depending on dynamic human flow.

Various embodiments above describe a system and a method of utilizing historical human flow data from existing optimized or partially optimized multiple-facility buildings or existing un-configured buildings to derive optimized configurations for a selected building including new designed buildings or un-optimized existing buildings in a finer granularity for accurate thermal load demand response in advance. This may be achieved by a few processes, including zone occupancy prediction, similar zone matching, and zone configuration simulations described above.

According to various embodiments, the zone occupancy prediction may be carried out using the real-time occupancy data (e.g. real-time Wi-Fi data) available in the building and a series of facility-based occupancy patterns. These occupancy patterns are extracted from a large amount of historical occupancy data, and static building data including the facilities types and dimension in each zone. Each of the occupancy patterns may include the key information about the dwelling time and visiting sequence to obtain a more accurate occupancy prediction in facilities and zones with high dynamic human flow. Then the zone matching process may be carried out in the historical Building Management System (BMS) database of pre-configured buildings and/or un-configured buildings, by using one or more of the predicted zone occupancy, zone spatial data, facility visiting sequence, weather data and real-time sensing data as the main features. The historical configuration setting for the zone air properties and supply air properties of the matched optimized or partially optimized zones may be retrieved from the BMS database. The configuration of the matched un-optimized zones may also be used to determine the configurations for the zone of the selected building. These historical configuration setting may be considered as the potential configurations to optimize the selected building.

According to various embodiments, the configuration optimization is also provided, which utilizes an existing building energy simulation tool or algorithms to simulate the performance of all the potential zone configuration combinations for the entire building in terms of one or more key performance indicators (KPI), such as energy saving, thermal comfort index, or system energy efficiency. Then the overall performance is evaluated by a scoring function in terms of the KPIs. The selection of KPIs and formulation of the scoring function could be based on user's preference. The combination of configurations that give the highest score will be selected for the air side, and the new configuration of chiller plant will be estimated according to the air side configuration. After both configurations have been applied through BMS control panel, the system is going to validate the actual performance by comparing with user-defined threshold, to evaluate the effectiveness of the selected configurations.

Based on real-time Wi-Fi localization and multiple facility-based occupancy patterns, the future occupancy in each facility and zone can be predicted more accurately in a finer granularity under a highly dynamic human flow according to various embodiments.

The configuration optimization at zone level as provided by various embodiments helps to maintain the comfort level of each occupant in the building by avoiding over/under heating or cooling in each specific zone area, meanwhile, to achieve best energy saving for building owner.

According to various embodiments, an APP, e.g., the APP 292 shown in FIG. 4, may be created to provide the building owner with the information about the best configuration and the corresponding validation results to better manage the building energy performance.

The method, device and system described in various embodiments above may be used for an existing building during the operating period, as well as a new building during the leasing period.

In the building operating period, the method, device and system according to various embodiments above are able to find the optimized HVAC/ACMV configurations in zone level to address the upcoming demand variation of both thermal load and fresh air in a multi-facilities based building e.g.: shopping mall, due to high dynamic human flow. This configuration set in terms of a series of set point on both chilled water and air side can be suggested to the building owner or facility manager to implement through the BMS control panel in advance. This helps to maintain the comfort level of each occupant in the building by avoiding over/under heating or cooling in each specific zone area, and meanwhile, to achieve best energy saving for building owner.

In the leasing period of a new building (such as a shopping mall), the method, device and system according to various embodiments above may help to create appropriate building floor plan to guide a reasonable common visiting sequence of customer within the same zone or among zones, and eventually lead to the best energy saving and energy usage optimization for the entire building.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A system for controlling an HVAC system or an ACMV system of a building, the building comprising a plurality of zones and each zone comprising one or more types of facilities, the system comprising:
   an occupancy pattern extractor configured to generate at least one facility-based occupancy pattern for each facility type based on historical occupancy data and spatial information of the building;
   a zone occupancy predictor configured to predict zone occupancy variation of each zone after a predetermined time period, based on the facility-based occupancy patterns and real-time occupancy data;
   a similar zone matcher configured to match each zone with one or more pre-stored zones in a historical building database based on the predicated zone occupancy variation, and determine one or more air handler configurations for each zone based on the matched pre-stored zones;
   a configuration generator configured to determine a plurality of configuration combinations for the building by combining the determined air handler configurations for the plurality of zones, each configuration combination comprising one of the determined air handler configurations for each zone; and
   a configuration optimizer configured to determine an optimal configuration combination from the plurality of configuration combinations based on one or more key performance indicators.

2. The system according to claim 1, wherein the occupancy pattern extractor is configured to generate more than one facility-based occupancy pattern for each facility type based on different visitor groups,
   wherein the visitor groups are categorized by at least one of gender, age, or occupation.

3. The system according to claim 1,
   wherein the facility-based occupancy pattern for each facility type comprises one or more attributes selected from facility identification, facility name, average dwelling time, day of a week, time range, and next destination.

4. The system according to claim 1, wherein the zone occupancy predictor is further configured to:
   determine a visiting sequence for each visitor detected from the real-time occupancy data based on the facility-based occupancy patterns;
   predict a future occupancy after the predetermined time period for each zone based on the visiting sequence; and
   predict the zone occupancy variation of each zone after the predetermined time period based on the predicted future occupancy and the real-time occupancy data.

5. The system according to claim 4, wherein the zone occupancy predictor is further configured to:
   predict a dwelling time staying at a current facility and a next facility for each visitor, based on the visiting sequence;
   predict a future occupancy after the predetermined time period in each facility based on the predicted dwelling time and the predicted next facility;
   predict the future occupancy after the predetermined time period for each zone based on the predicted future occupancy in each facility.

6. The system according to claim 1, wherein the similar zone matcher is configured to:
   match each zone with the one or more pre-stored zones in the historical building database further based on at least one of a visiting sequence within the zone, the spatial information of the building, real-time zone air properties, desired thermal comfort level index, time stamp, or weather data.

7. The system according to claim 1,
wherein the similar zone matcher is further configured to determine one or more zone air configurations for each zone based on the matched pre-stored zones.

8. The system according to claim 1,
wherein the historical building database comprises at least one of zone air configurations or air handler configurations of the pre-stored zones,
wherein the pre-stored zones comprises zones of at least one of a pre-configured building or an un-configured building, and
wherein the pre-stored zones comprises at least one of optimized, partially optimized, or un-optimized zones.

9. The system according to claim 1,
wherein the air handler configuration comprises at least one of supply air temperature set point, variable speed drive fan speed set point, or fresh air damper position set point.

10. The system according to claim 1, wherein
if the matched zone is an un-optimized zone of a pre-configured building or an un-configured building, the similar zone matcher is further configured to:
retrieve zone air properties variation of the matched pre-stored zone;
estimate future zone air properties of the zone based on the retrieved zone air properties variation;
estimate at least one of a thermal load demand variation or a fresh air demand variation based on the estimated future zone air properties; and
determine an air handler configuration for the zone based on at least one of the estimated thermal load demand variation or the estimated fresh air demand variation.

11. The system according to claim 1, further comprising:
a chiller plant optimizer configured to determine an optimal chiller plant configuration based on the optimal configuration combination and the spatial information of the building.

12. The system according to claim 11, wherein the chiller plant optimizer is further configured to:
determine a thermal load variation for each zone based on the optimal configuration combination and the spatial information of the building;
sum up the thermal load variations for the plurality of zones of the building; and
determine the optimal chiller plant configuration based on the sum of the thermal load variations.

13. The system according to claim 11, further comprising:
a configuration validator configured to apply the optimal configuration combination and the optimal chiller plant configuration to the building for the predetermined time period, determine values of the one or more key performance indicators after the predetermined time period, and validate the optimal configuration combination and the optimal chiller plant configuration based on a comparison between the determined values of the one or more key performance indicators and desired values of the one or more key performance indicators.

14. The system according to claim 1,
wherein the one or more key performance indicators comprise one or more of energy saving, energy efficiency, energy usage, or thermal comfort.

15. A method of controlling an HVAC system or an ACMV system of a building, the building comprising a plurality of zones and each zone comprising one or more types of facilities, the method comprising:
generating at least one facility-based occupancy pattern for each facility type based on historical occupancy data and spatial information of the building;
predicting zone occupancy variation of each zone after a predetermined time period, based on the facility-based occupancy patterns and real-time occupancy data;
matching each zone with one or more pre-stored zones in a historical building database based on the predicated zone occupancy variation, and determining one or more air handler configurations for each zone based on the matched pre-stored zones;
determining a plurality of configuration combinations for the building by combining the determined air handler configurations for the plurality of zones, each configuration combination comprising one of the determined air handler configurations for each zone; and
determining an optimal configuration combination from the plurality of configuration combinations based on one or more key performance indicators.

* * * * *